(12) United States Patent
Yamada et al.

(10) Patent No.: US 9,162,588 B2
(45) Date of Patent: Oct. 20, 2015

(54) SEAT SLIDE APPARATUS FOR VEHICLE

(71) Applicant: AISIN SEIKI KABUSHIKI KAISHA, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 226 days.

(21) Appl. No.: 13/911,399

(22) Filed: Jun. 6, 2013

(65) Prior Publication Data

US 2013/0341479 A1 Dec. 26, 2013

(30) Foreign Application Priority Data

Jun. 21, 2012 (JP) .................. 2012-140219

(51) Int. Cl.
*F16M 13/00* (2006.01)
*B60N 2/07* (2006.01)

(52) U.S. Cl.
CPC ............ *B60N 2/0722* (2013.01); *B60N 2/0705* (2013.01); *B60N 2/0715* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,445,143 A | * | 5/1969 | Swenson | 384/34 |
| 3,649,090 A | * | 3/1972 | Dutot | 384/23 |
| 3,679,274 A | * | 7/1972 | Nance | 384/21 |
| 3,692,272 A | * | 9/1972 | Radke | 248/429 |
| 3,848,937 A | * | 11/1974 | Harder, Jr. | 384/34 |
| 4,183,493 A | * | 1/1980 | Koutsky | 248/430 |
| 4,209,159 A | * | 6/1980 | Becker et al. | 248/430 |
| 6,874,747 B2 | * | 4/2005 | Oh | 248/430 |
| 7,325,851 B2 | * | 2/2008 | Ito et al. | 296/65.13 |
| 7,931,246 B2 | * | 4/2011 | Brewer et al. | 248/429 |
| 8,270,114 B2 | * | 9/2012 | Argumedo et al. | 360/130.21 |
| 8,382,057 B2 | * | 2/2013 | Napau et al. | 248/423 |
| 8,939,424 B2 | * | 1/2015 | Fukuda et al. | 248/429 |
| 2004/0131291 A1 | * | 7/2004 | Niimi et al. | 384/47 |
| 2004/0232750 A1 | * | 11/2004 | Rohee et al. | 297/334 |
| 2007/0090263 A1 | * | 4/2007 | Yamada et al. | 248/429 |
| 2007/0176072 A1 | * | 8/2007 | Ikegaya et al. | 248/429 |
| 2009/0058169 A1 | * | 3/2009 | Soga | 297/463.1 |
| 2010/0320353 A1 | | 12/2010 | Kojima et al. | |
| 2011/0024595 A1 | * | 2/2011 | Oi et al. | 248/429 |
| 2011/0198464 A1 | * | 8/2011 | Hoge | 248/223.41 |

FOREIGN PATENT DOCUMENTS

JP 2008-44518 2/2008

* cited by examiner

*Primary Examiner* — Monica Millner
(74) *Attorney, Agent, or Firm* — Oblon, McClelland, Maier & Neustadt, L.L.P.

(57) ABSTRACT

A seat slide apparatus for a vehicle includes an upper rail retaining a seat above the upper rail, a lower rail retaining the upper rail in a state where the upper rail moves relative to the lower rail, a rolling element arranged between the lower rail and the upper rail and a retaining member configured to retain the rolling element between the lower rail and the upper rail, the retaining member including a protruding portion having a top portion arranged to slidably contact with a rolling surface at which the rolling element rolls. The protruding portion includes a spreading portion extending from the top portion in an elongating direction, the elongating direction conforming to a path of the rolling element formed on the rolling surface, the spreading portion tapering to a sharp end form with an increasing distance from the top portion in the elongating direction.

6 Claims, 21 Drawing Sheets

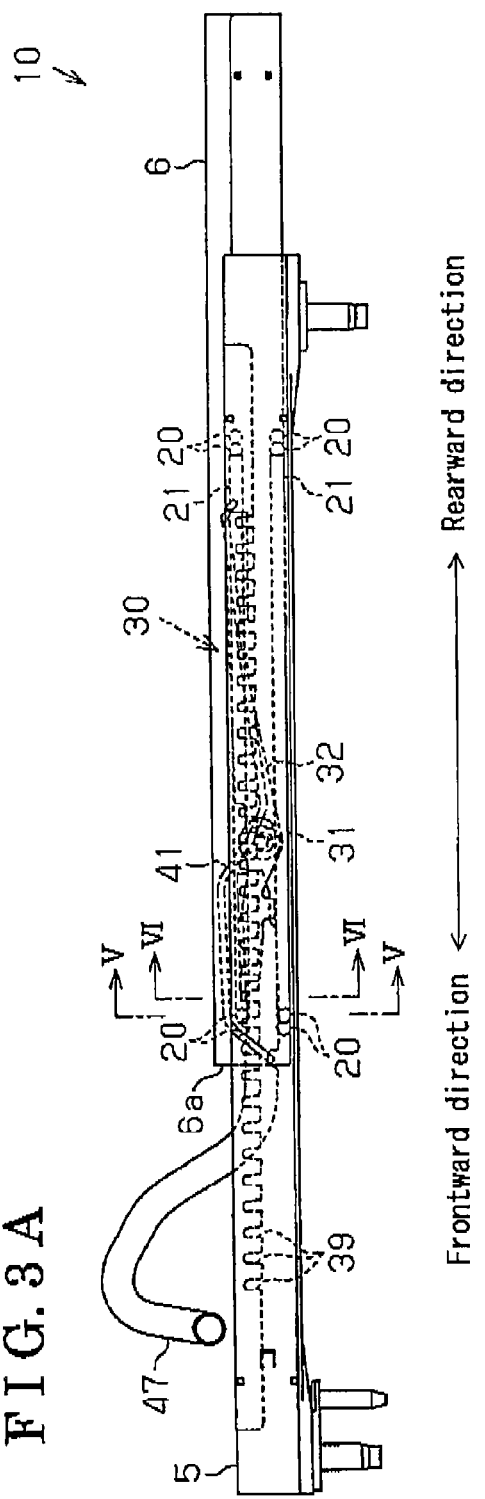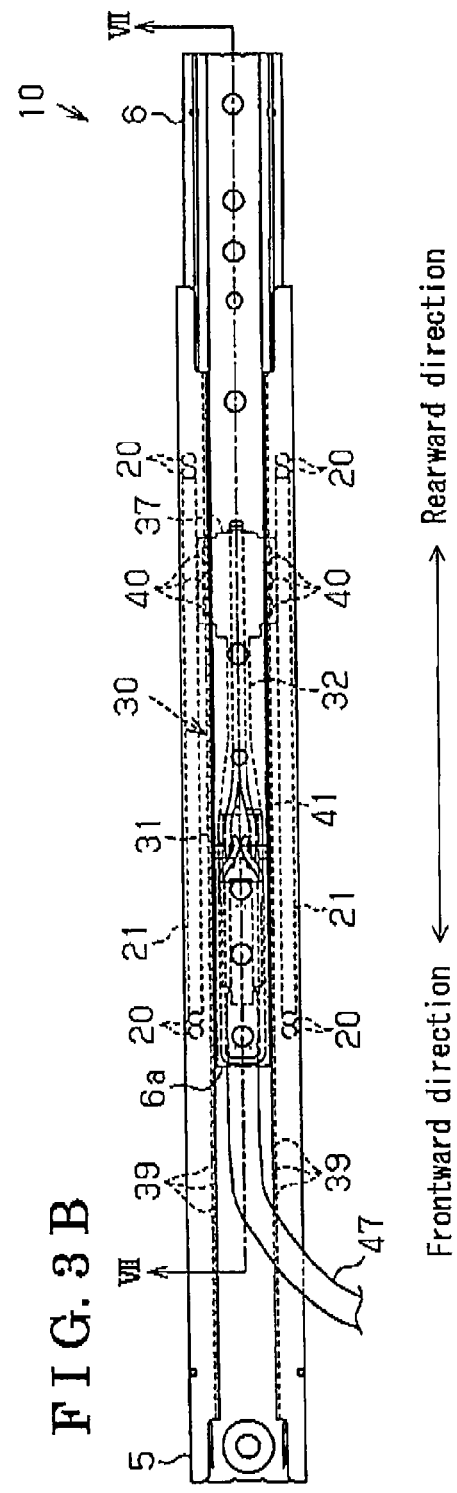

F I G. 11
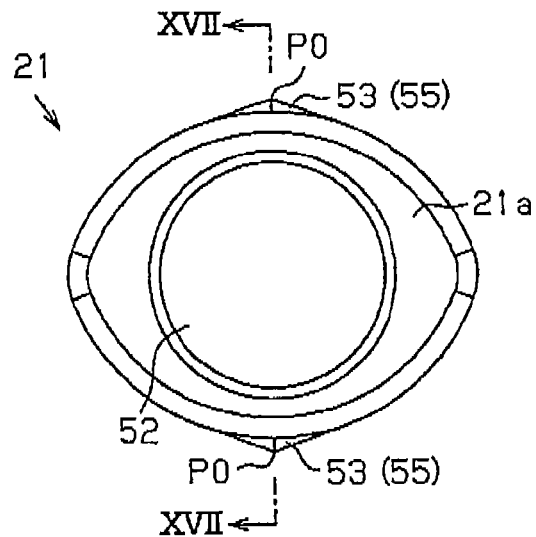
F I G. 12
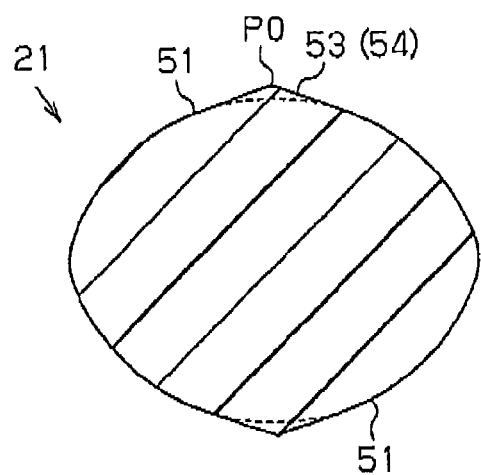
F I G. 13
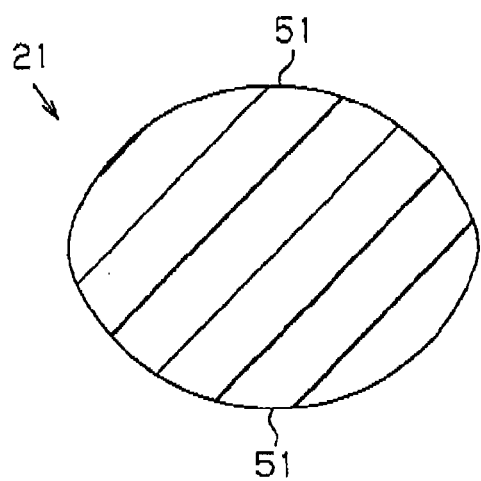

F I G. 15
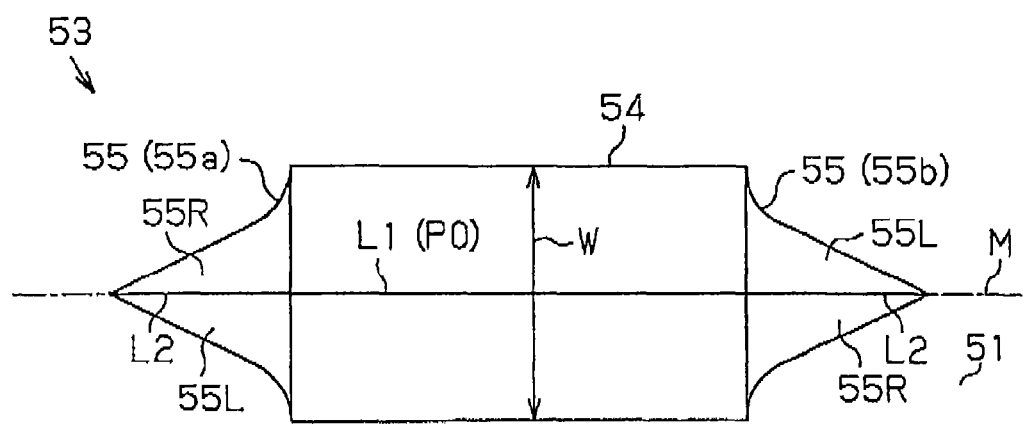
F I G. 16
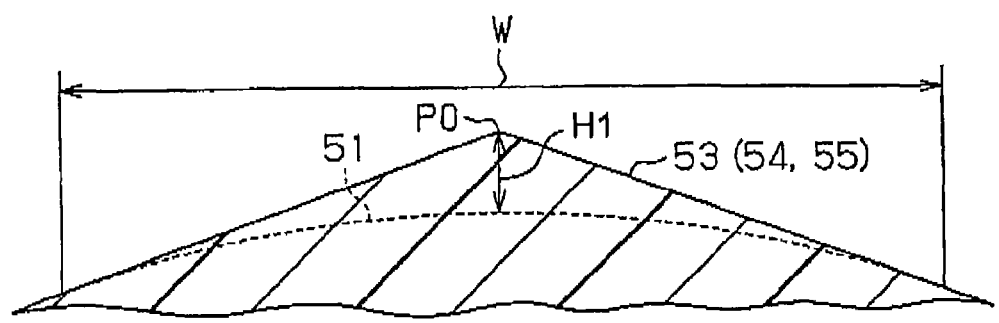

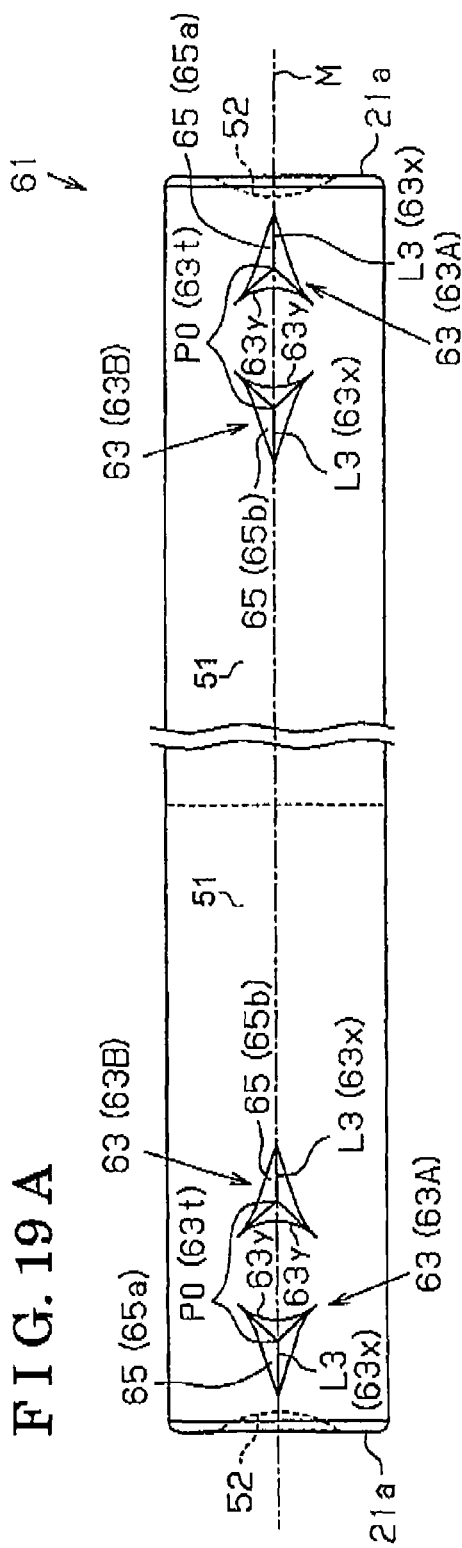
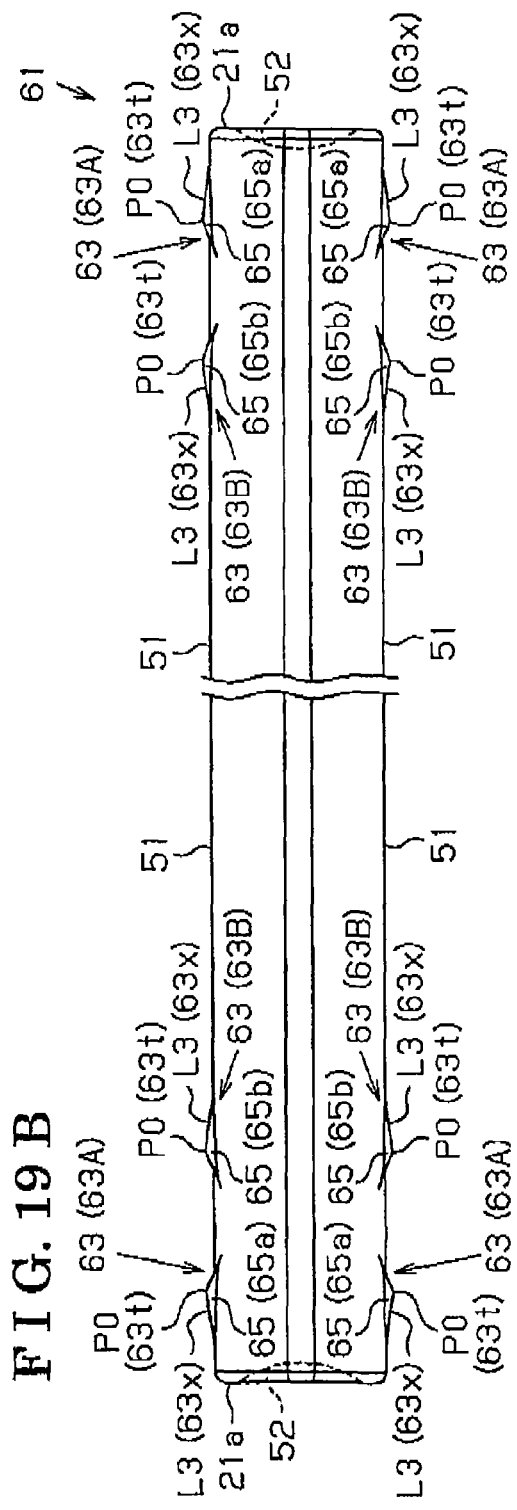
FIG. 19A
FIG. 19B

SEAT SLIDE APPARATUS FOR VEHICLE

CROSS REFERENCE TO RELATED APPLICATIONS

This application is based on and claims priority under 35 U.S.C. §119 to Japanese Patent Application 2012-140219, filed on Jun. 21, 2012, the entire content of which is incorporated herein by reference.

TECHNICAL FIELD

This disclosure generally relates to a seat slide apparatus for a vehicle.

BACKGROUND DISCUSSION

A seat slide apparatus for a vehicle including an upper rail retaining a seat above the upper rail and a lower rail retaining the upper rail in a state where the upper rail moves relative to the lower rail is known. In addition, for example, JP2008-44518A, hereinafter referred to as Reference 1, discloses a seat slide apparatus having a configuration where a rolling element is arranged between a lower rail and an upper rail. In the seat slide apparatus according to Reference 1, a retaining member retains the rolling element between the lower rail and the upper rail. The retaining member includes a protruding portion that is configured to slidably contact with a rolling surface in a state where the protruding portion makes pressure contact with the rolling surface. Note that the rolling surface refers to a surface on either the lower rail or the upper rail at which the rolling element retained by the retaining member rolls.

More specifically, rolling of the rolling element, which is in contact with each of the lower rail and the upper rail, may provide a smooth movement of the lower rail and the upper rail relative to each other in a state where the lower rails and the upper rails move relative to each other in accordance with a seat slide operation. The protruding portion is arranged on the retaining member to provide a comfortable operational feeling and a distinct control feeling to the seat slide operation by a frictional force at the protruding portion, which is appropriately restraining the excessively smooth movement.

Nevertheless, in a configuration where a rolling element is arranged between a lower rail and an upper rail, smooth rolling of the rolling element thereat is of at most importance. For example, in a seat slide apparatus for a vehicle, a foreign object may enter between a lower rail and an upper rail of the seat slide apparatus. Quality of operational feeling may lower due to a presence of the foreign object that interferes with smooth rolling of the rolling element, which is considered as a drawback.

A need thus exists for a seat slide apparatus for a vehicle, which is not susceptible to the drawback mentioned above.

SUMMARY

A seat slide apparatus for a vehicle includes an upper rail retaining a seat above the upper rail, a lower rail retaining the upper rail in a state where the upper rail moves relative to the lower rail, a rolling element arranged between the lower rail and the upper rail, and a retaining member configured to retain the rolling element between the lower rail and the upper rail, the retaining member including a protruding portion having a top portion arranged to slidably contact with a rolling surface at which the rolling element rolls. The protruding portion includes a spreading portion extending from the top portion in an elongating direction, the elongating direction conforming to a path of the rolling element formed on the rolling surface, the spreading portion tapering to a sharp end form with an increasing distance from the top portion in the elongating direction, the spreading portion configured to remove a foreign object from the path.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a side view drawing of the seat slide apparatus for a vehicle according to this disclosure;

FIG. 3B is a top view drawing of the seat slide apparatus for a vehicle according to this disclosure;

FIG. 11 is a front view drawing of the retaining member according to the first embodiment of the seat slide apparatus for a vehicle;

FIG. 12 is a cross-sectional view drawing of the retaining member according to the first embodiment of the seat slide apparatus for a vehicle taken along line XII-XII in FIG. 10B;

FIG. 13 is a cross-sectional view drawing of the retaining member according to the first embodiment of the seat slide apparatus for a vehicle taken along line XIII-XIII in FIG. 10B;

FIG. 15 is a top view drawing of a protruding portion according to the first embodiment of the seat slide apparatus for a vehicle;

FIG. 16 is a cross-sectional view drawing of the protruding portion according to the first embodiment of the seat slide apparatus for a vehicle illustrating a cross section perpendicular to an elongating direction of the protruding portion;

FIG. 19A is a top view drawing of the retaining member according to the second embodiment of the seat slide apparatus for a vehicle;

FIG. 19B is a side view drawing of the retaining member according to the second embodiment of the seat slide apparatus for a vehicle;

DETAILED DESCRIPTION

Figure 1:
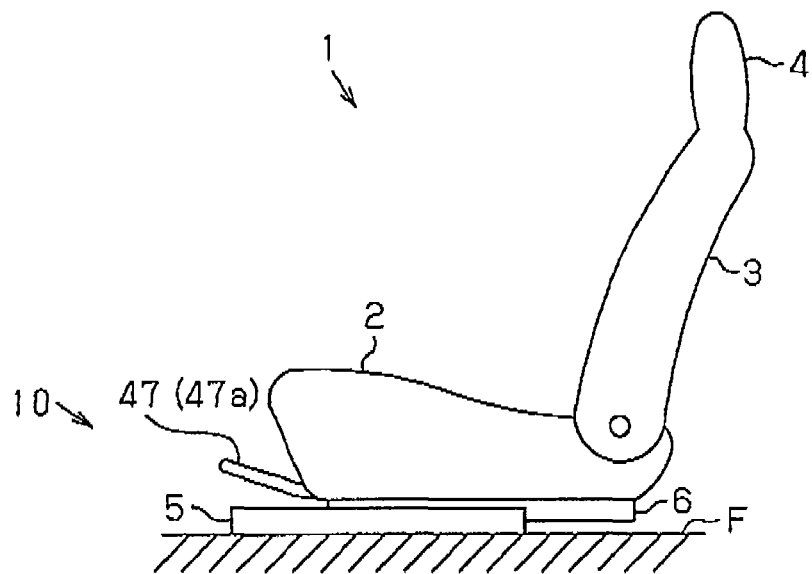
FIG. 1 is a drawing illustrating a simplified configuration of a seat slide apparatus for a vehicle according to this disclosure.

A first embodiment of a seat slide apparatus 10 for a vehicle according to this disclosure will be described referring to drawings. As FIG. 1 illustrates, a seat 1 for a vehicle includes a seat cushion 2, a seat back 3 and a head restraint 4. The seat back 3 is arranged to make a tilting movement relative to a rearward end portion of the seat cushion 2. The head restraint 4 is arranged at an upward end of the seat back 3.

As FIGS. 1, 2, 3A, and 3B illustrate, a pair of lower rails 5 arranged parallel to each other are arranged on a floor portion F of the vehicle. To each of the lower rails 5, an upper rail 6 is attached such that the upper rail 6 moves on the lower rail 5 relative to the lower rail 5. The seat cushion 2 of the seat 1 is retained above a pair of upper rails 6.

In other words, in the seat slide apparatus 10 for a vehicle according to the first embodiment, the lower rails 5 and the upper rails 6 arranged such that the lower rails 5 and the upper rails 6 may move relative to each other form the seat slide apparatus 10 for a vehicle. A passenger on the vehicle may adjust a position of the seat 1 in a frontward-rearward direction of the vehicle, which is a leftward-rightward direction in FIG. 1, by using the above-mentioned arrangement provided with the seat slide apparatus 10 for a vehicle.

Figure 4:
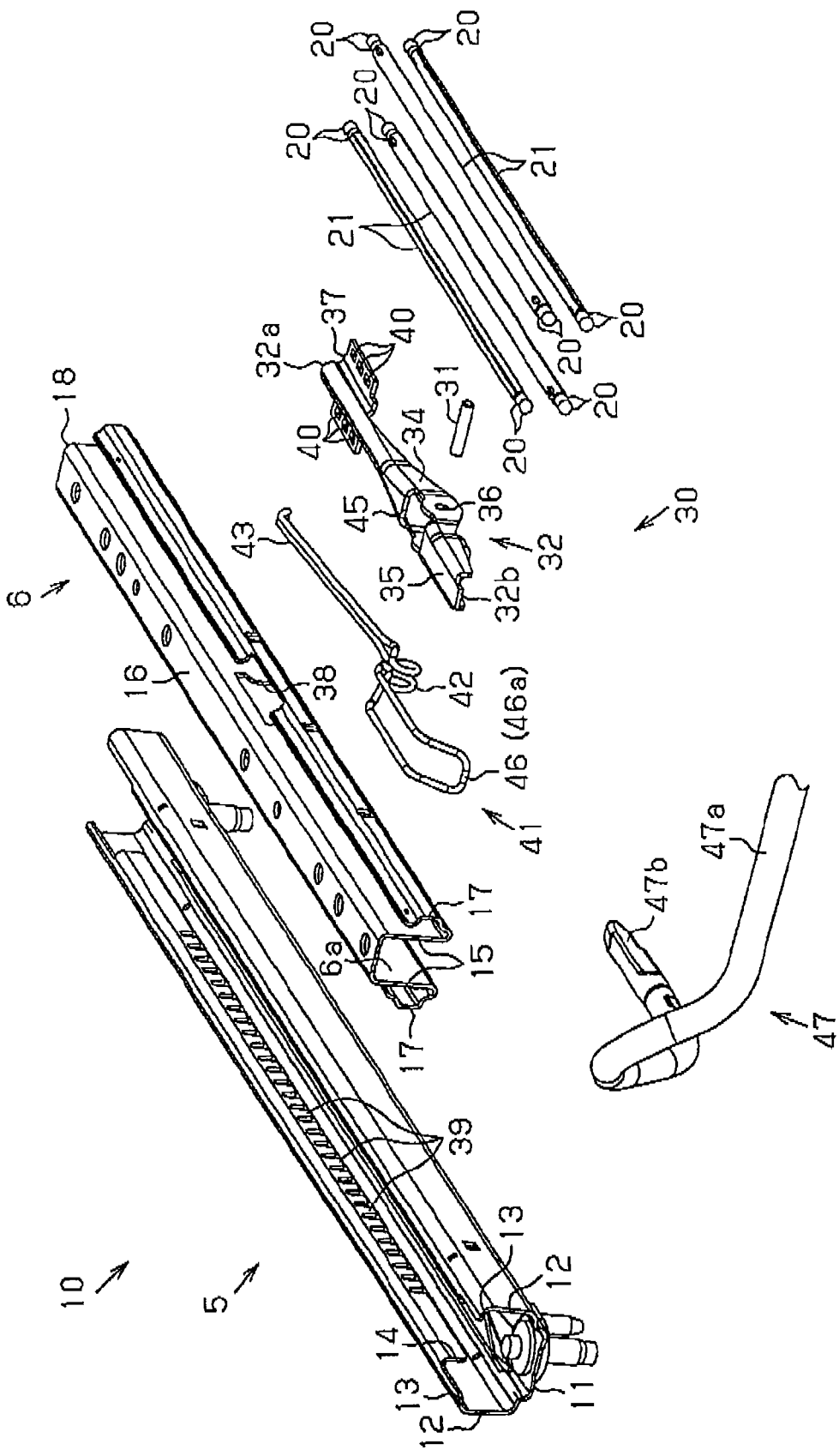
FIG. 4 is an exploded perspective view drawing of the seat slide apparatus for a vehicle according to this disclosure.
Figure 5:
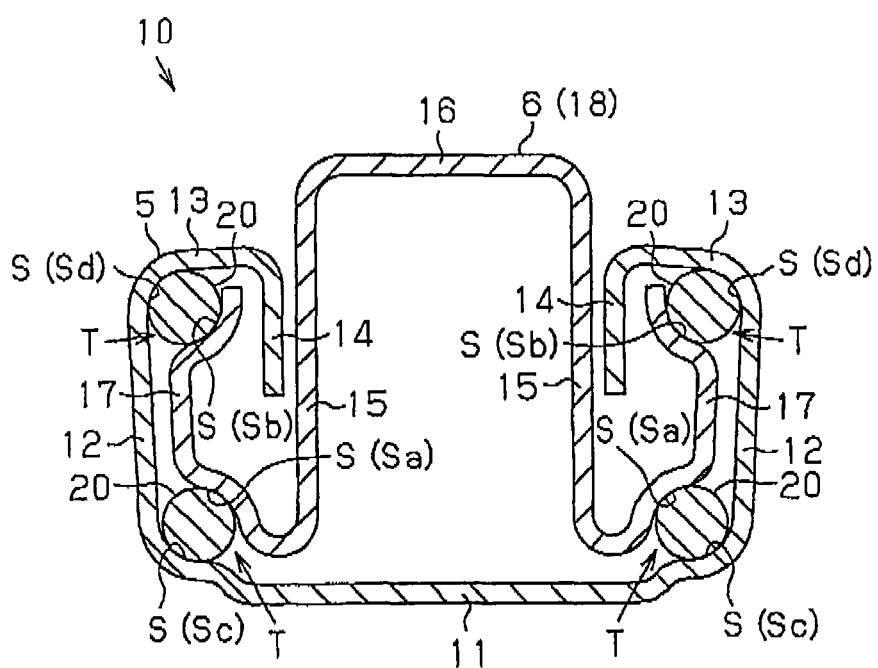
FIG. 5 is a cross-sectional view drawing of the seat slide apparatus for a vehicle according to this disclosure taken along line V-V in FIG. 3A.
Figure 6:
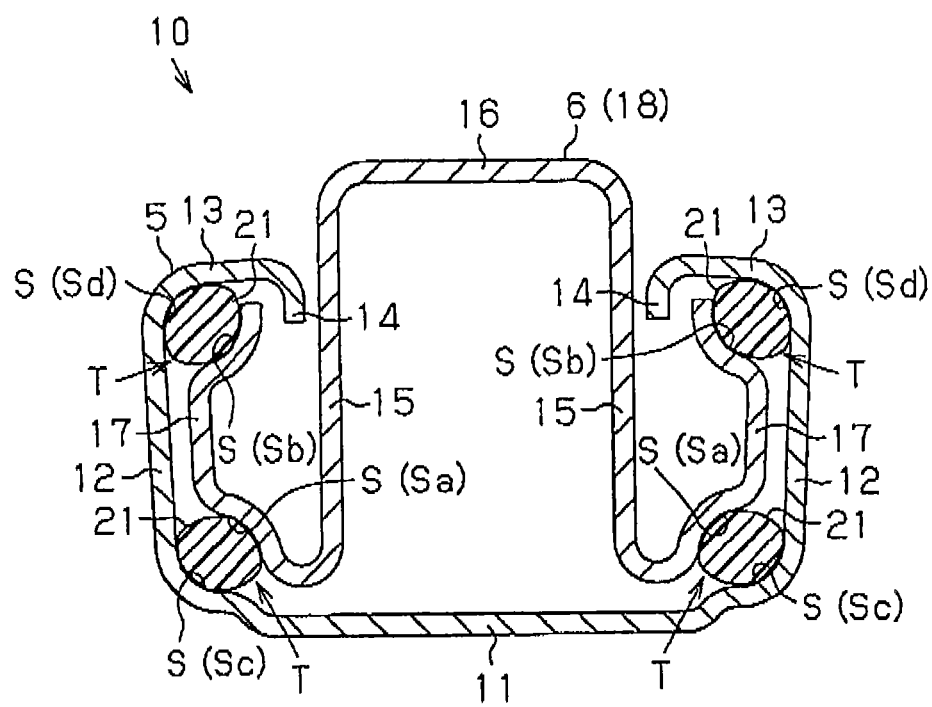
FIG. 6 is a cross-sectional view drawing of the seat slide apparatus for a vehicle according to this disclosure taken along line VI-VI in FIG. 3A.

More specifically, as FIGS. 4 to 6 illustrate, each of the lower rails 5 includes a bottom wall 11 formed in a flat plate form. The bottom wall 11 serves as a portion at which the lower rail 5 is fixed to the floor portion F of the vehicle, as FIG. 1 illustrates. At each end of the bottom wall 11 in a width direction, which is a leftward-rightward direction in FIG. 5, an outer wall 12 erects. At an upward end of each of the outer walls 12, which is an end portion in an upward direction in FIGS. 5 and 6, an upper wall 13 that is formed in a flange form is formed to extend in an inward direction in the width direction. At an end of each of the upper walls 13, a folded back portion 14 is formed such that the folded back portion 14 extends downwardly.

Furthermore, the upper rail 6 includes a pair of side walls 15 facing each other in the width direction. A top wall 16 that is formed in a plate form connects upper ends of the side walls 15. At a lower end of each of the side walls 15, a folded portion 17 is formed such that the folded portion 17 folds back in an outward direction in the width direction relative to each of the side walls 15.

Each of the upper rails 6 of the seat slide apparatus 10 for a vehicle according to the first embodiment attaches to the lower rail 5 such that a body 18 formed by the pair of side walls 15 and the top wall 16 is arranged between the folded back portions 14 of the lower rail 5. Note that the body 18 is formed in a form having a cross-sectional shape similar to a U-shape. Each of the folded portions 17 of each of the upper rails 6 extends upwardly from a lower end of each of the side walls 15 substantially parallel to the outer wall 12 of the lower rail 5, the outer wall 12 that is at a position facing the folded portion 17 in the width direction. Furthermore, each of the folded portions 17 is formed with a curved and recessed surface Sa and another curved and recessed surface Sb. The curved and recessed surface Sa is formed on a portion of the folded portion 17 facing a curved and recessed surface Sc that is formed on the lower rail 5 at a connecting portion where the bottom wall 11 and the outer wall 12 connect. The curved and recessed surface Sb is formed on a portion of the folded portion 17 facing a curved and recessed surface Sd that is formed on the lower rail 5 at a connecting portion where the outer wall 12 and the upper wall 13 connect. Each of the curved and recessed surface Sa and the curved and recessed surface Sb extends in a direction in which the upper rail 6 extends. In the seat slide apparatus 10 for a vehicle according to the first embodiment, the rolling elements 20, each of which is formed in a form of a ball, are arranged between the curved and recessed surfaces Sa, Sb formed on each of the upper rails 6 and the curved and the recessed surfaces Sc, Sd formed at the aforementioned connecting portions on each of the lower rails 5.

More specifically, four rolling paths T are formed between each set of the lower rail 5 and the upper rail 6. The rolling path T is formed at the surfaces facing each other between the curved and recessed surface Sa formed on the upper rail 6 and the curved and recessed surface Sc formed on the lower rail 5. Furthermore, the rolling path T is formed at the surfaces facing each other between the curved and recessed surface Sb formed on the upper rail 6 and the curved and recessed surface Sd formed on the lower rail 5. Each of the four rolling paths T extends in an extending direction of the lower rail 5 and the upper rail 6. Note that the extending direction of the lower rail 5 and the upper rail 6 is a direction perpendicular to a surface where FIGS. 5 and 6 are drawn, which is a leftward-rightward direction in FIGS. 3A and 3B. As FIG. 5 illustrates, each of the rolling elements 20 is provided with a diameter such that each of the rolling elements 20 makes contact with the surfaces forming the rolling path T, the surfaces facing each other that are the curved and recessed surface Sa formed on the upper rail 6 and the curved and recessed surfaces Sc formed on the lower rail 5 and the curved and recessed surface Sb formed on the upper rail 6 and the curved and recessed surfaces Sd formed on the lower rail 5.

In other words, in a state where the lower rails 5 and the upper rails 6 move relative to each other, each of the rolling elements 20 rolls on a path that conforms to the extending direction of the lower rails 5 and the upper rails 6, the path that is formed on a rolling surface S. Note that each of the curved and recessed surfaces Sa, Sb on each of the upper rails 6 and each of the curved and recessed surfaces Sc, Sd on each of the lower rails 5 serves as the rolling surface S. Accordingly, in the seat slide apparatus 10 for a vehicle according to the first embodiment, a smooth relative movement between the lower rails 5 and the upper rails 6 in a direction that conforms to the extending direction of the lower rails 5 and the upper rails 6 is secured.

As FIGS. 3A, 3B, 4, and 6 illustrate, each of the rolling paths T in the seat slide apparatus 10 for a vehicle according to the first embodiment contains a retaining member 21 formed in an elongated stick form. Each of the rolling elements 20 is arranged at a position close to each end portion of each of the retaining members 21. More specifically, two rolling elements are arranged at a frontward end portion of each of the retaining members 21, which is leftward in FIGS. 3A and 3B, and two rolling elements are arranged at a rearward end portion of each of the retaining members 21, which is rightward in FIGS. 3A and 3B. Accordingly, in the seat slide apparatus 10 for a vehicle according to the first embodiment, a multiple number of rolling elements 20 are arranged such that the rolling elements 20 are retained at positions separated by a space in the extending direction of the lower rail 5 and the upper rail 6.

As FIGS. 3A, 3B, 4 and 7 illustrate, the seat slide apparatus 10 for a vehicle according to the first embodiment includes a lock mechanism 30 that may restrain the relative movement between each of the lower rails 5 and each of the upper rails 6.

Figure 7:
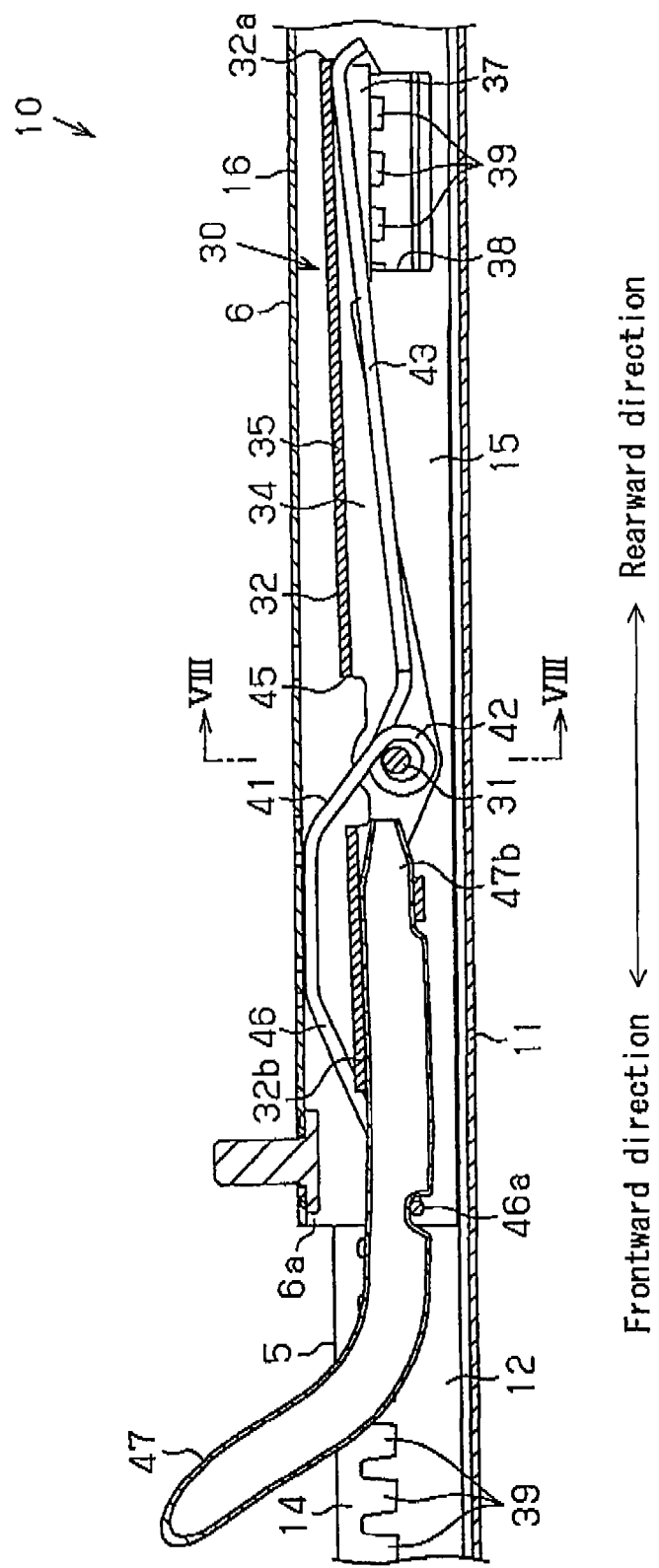
FIG. 7 is a cross-sectional view drawing of the seat slide apparatus for a vehicle according to this disclosure taken along line VII-VII in FIG. 3B.
Figure 8:
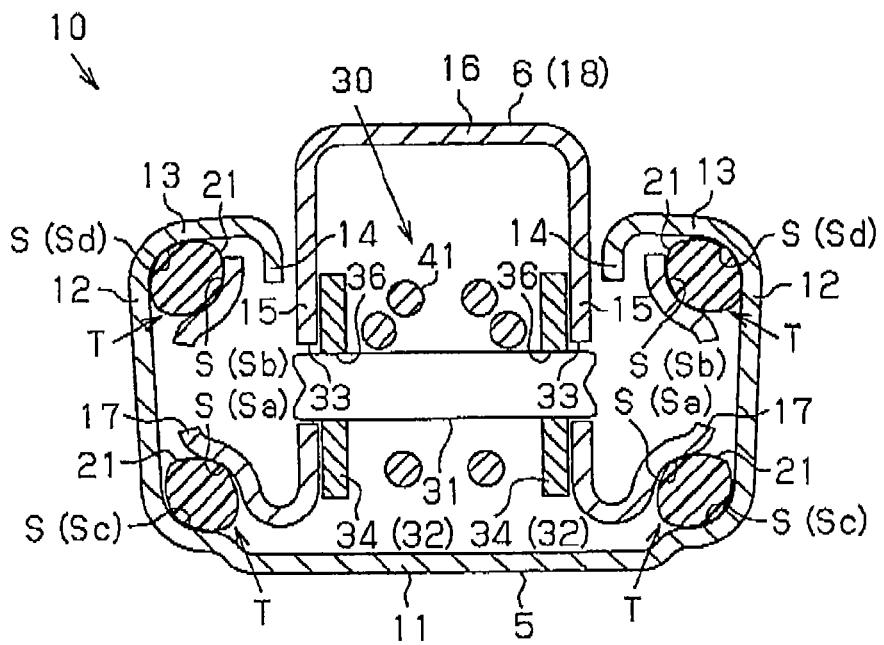
FIG. 8 is a cross-sectional view drawing of the seat slide apparatus for a vehicle according to this disclosure taken along line VIII-VIII in FIG. 7.

As FIG. 7 illustrates, the lock mechanism 30 includes a retaining shaft 31 retained by the upper rail 6 and a lock lever 32 that makes a rotational movement with the retaining shaft 31 as the center of rotation. Note that, as FIG. 8 illustrates, in the seat slide apparatus 10 for a vehicle according to the first embodiment, each of the side walls 15 of each of the upper rails 6 is formed with a retaining through-hole 33. Each of the retaining through-holes 33 is positioned such that the retaining through-holes 33 are facing each other. End portions of the retaining shaft 31 are inserted into the retaining through-holes 33 so that the retaining shaft 31 becomes a bridge between the side walls 15.

As FIGS. 4, 7, and 8 illustrate, the lock lever 32 includes a pair of side plates 34 arranged between the side walls 15 of each of the upper rails 6. Furthermore, the lock lever 32 includes a top plate 35 connecting upper end portions of the side plates 34. Each of the side plates 34 is formed with a through-hole 36. Each of the through-holes 36 is positioned such that the through-holes 36 are facing each other. In a state where the retaining shaft 31 is inserted into the through-holes 36 formed on the side plates 34, the lock lever 32 is rotationally supported at the through-holes 36 with the retaining shaft 31 as the center of rotation.

As FIGS. 3A, 3B, and 4 illustrate, at an edge 32a of the lock lever 32, lock portions 37 extending outwardly in the width direction are formed. Each of the lock portions 37 is formed in an external form similar to a flat plate. Each of the side walls 15 of each of the upper rails 6 is formed with a through-hole 38. The through-holes 38 are provided at positions that correspond to the edge 32a of the lock lever 32. The lock portions 37 are inserted into the through-holes 38. Furthermore, each of the folded back portions 14 of each of the lower rails 5 is provided with a multiple number of locking protrusions 39 formed in a comb teeth-like form that extends downwardly. In a state where end portions of the lock portions 37 are inserted into the through-holes 38, the end portions of the lock portions 37 are arranged at positions outward of a cross-sectional shape of the upper rail 6, the shape similar to a U-shape, which is formed by a pair of side walls 15 and the top wall 16. At each end portion of the lock portions 37, a multiple number of locking through-holes 40 are formed to receive and to engage with the locking protrusions 39 of the lower rail 5.

More specifically, in the lock mechanism 30 of the seat slide apparatus 10 for a vehicle according to the first embodiment, the lock lever 32, which is retained by the upper rail 6, makes a rotating movement with the retaining shaft 31 as the center of rotation. The lock portions 37 are provided at the edge 32a. In a state where the lock portions 37 move in the upward direction, the locking through-holes 40 of the lock portions 37 engage with the locking protrusions 39 arranged on the lower rail 5. Accordingly, a relative movement between the lower rail 5 and the upper rail 6 may be restrained.

More specifically, as FIGS. 4 and 7 illustrate, the lock mechanism 30 of the seat slide apparatus 10 for a vehicle according to the first embodiment includes a spring member 41, which is formed by folding a wire material. More specifically, the spring member 41 includes a coil portion 42, which is arranged outward in a radial direction of the retaining shaft 31. The coil portion 42 is arranged in a state such that the coil portion 42 is wound around the retaining shaft 31. The spring member 41 further includes a first extending portion 43 extending from the coil portion 42 in a direction toward the edge 32a of the lock lever 32, which is rightward in FIG. 7. The first extending portion 43 is arranged at a position between the side plates 34 of the lock lever 32. Furthermore, in the seat slide apparatus 10 for a vehicle according to the first embodiment, at the top plate 35 of the lock lever 32, a through-hole 45 is formed at a position above the retaining shaft 31. The spring member 41 includes a second extending portion 46. The spring member 41 is inserted into the through-hole 45 so that the second extending portion 46 extends from the coil portion 42 in a direction toward a rear edge 32b of the lock lever 32, which is leftward in FIG. 7.

More specifically, the spring member 41 of the seat slide apparatus 10 for a vehicle according to the first embodiment is formed to serve as a torsion coil spring. The first extending portion 43 is in contact with the top plate 35 of the lock lever 32 from a downward direction, which is downward in FIG. 7.

The second extending portion 46 is in contact with the top wall 16 of the upper rail 6 from the downward direction. The lock lever 32 is rotationally biased in a direction that makes the edge 32a to move upward, which is an upward direction in FIG. 7, according to the elastic force of the spring member 41.

Figure 2:
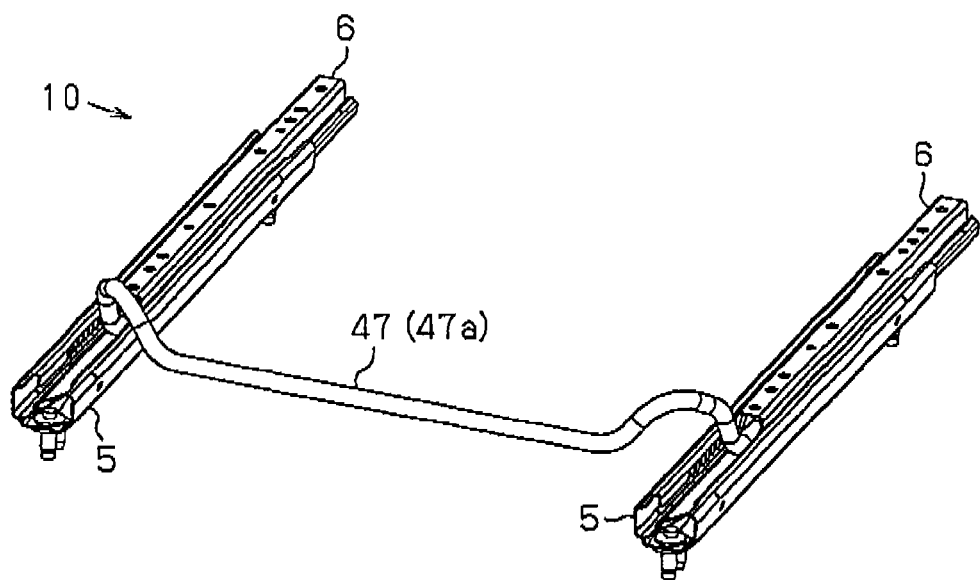
FIG. 2 is perspective view drawing illustrating the seat slide apparatus for a vehicle according to this disclosure.

The lock mechanism 30 of the seat slide apparatus 10 for a vehicle according to the first embodiment further includes an operation lever 47 that is operated for releasing a lock state of the lock mechanism 30. As FIG. 2 illustrates, the operation lever 47 of the seat slide apparatus 10 for a vehicle according to the first embodiment includes an operation portion 47a that is arranged to extend in a direction substantially perpendicular to the extending direction of the upper rail 6. Note that the extending direction is the frontward-rearward direction of the vehicle. End portions 47b of the operation lever 47 are bent from each end of the operation portion 47a to extend in the extending direction of the upper rail 6 arranged at a rightward position and the upper rail 6 arranged at a leftward position. The end portions 47b of the operation lever 47 are inserted into a frontward opening 6a of the upper rail 6 arranged at a rightward position and a frontward opening 6a of the upper rail 6 arranged at a leftward position. As FIG. 7 illustrates, each of the end portions 47b of the operation lever 47 is in contact with the rear edge 32b of the lock lever 32. More specifically, each of the end portions 47b is in contact with the top plate 35 from the downward direction.

In the seat slide apparatus 10 for a vehicle according to the first embodiment, an edge portion 46a of the second extending portion 46 of the spring member 41 extends beyond the rear edge 32b of the lock lever 32 in the frontward direction of the vehicle. More specifically, the edge portion 46a extends to a position close to the frontward opening 6a of the upper rail 6. The operation lever 47 is retained by the edge portion 46a of the second extending portion 46 at a downward portion of the operation lever 47, which is a portion of the operation lever 47 that is inserted into the upper rail 6.

In other words, the operation lever 47 is arranged such that each of the end portions 47b, which is inserted into the upper rail 6, makes a movement in the upward direction in a state where the operation portion 47a is pulled in the upward direction. At this time, each of the end portions 47b makes the rear edge 32b of each of the lock levers 32 to move in the upward direction so that the lock lever 32 makes a rotational movement in a direction that makes the edge 32a to move in the downward direction. In the lock mechanism 30 of the seat slide apparatus 10 for a vehicle according to the first embodiment, the rotational movement of the lock lever 32 releases an engaged state between the locking through-holes 40 on the lock lever 32 and the locking protrusions 39 of the lower rails 5 so that a movement of the upper rail 6 relative to the lower rail 5 is allowed.

Figure 14:
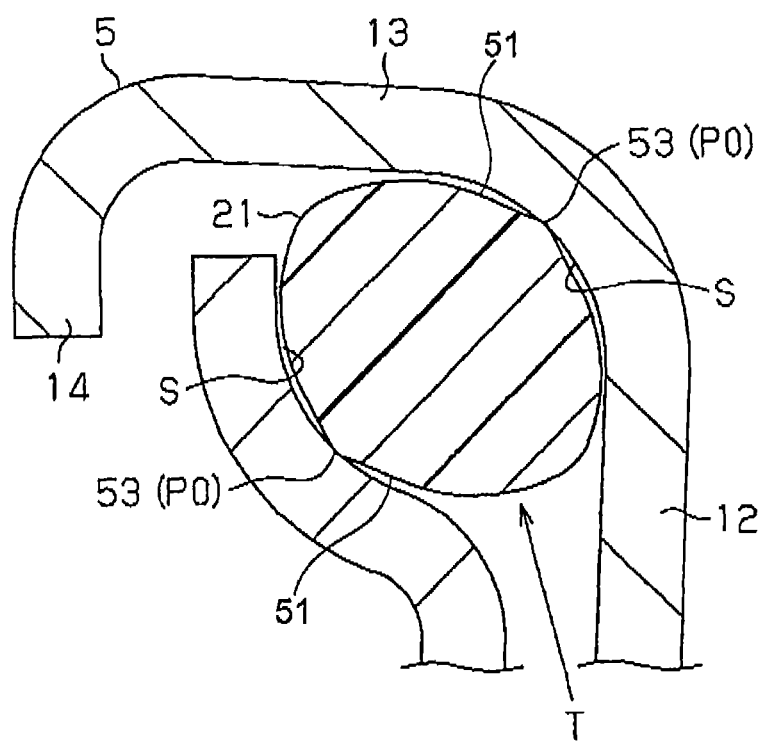
FIG. 14 is a cross-sectional view drawing illustrating a rolling path and the retaining member according to the first embodiment of the seat slide apparatus for a vehicle, the rolling path formed between a lower rail and an upper rail and the retaining member arranged in the rolling path.

A structure for removing a foreign object, the structure that is arranged on the retaining member 21 of the seat slide apparatus 10 for a vehicle according to the first embodiment, will be described next. As FIGS. 9, 10A, 10B, 11, 12, and 13 illustrate, the retaining member 21 of the seat slide apparatus 10 for a vehicle according to the first embodiment is formed in an elongated stick form having a cross-sectional shape similar to an oval. As FIG. 14 illustrates, each of the retaining members 21 is arranged in each of the rolling paths T, which is formed between the lower rail 5 and the upper rail 6. Portions of each of the retaining members 21 where smaller curves are provided on a peripheral surface of the retaining member 21 become the facing surfaces 51 facing the rolling surfaces S at which the rolling elements 20 roll. Each of the curved and recessed surfaces Sa, Sb on the upper rails 6 and each of the curved and recessed surfaces Sc, Sd on the lower rails 5 serves as the rolling surface S.

Figure 9:
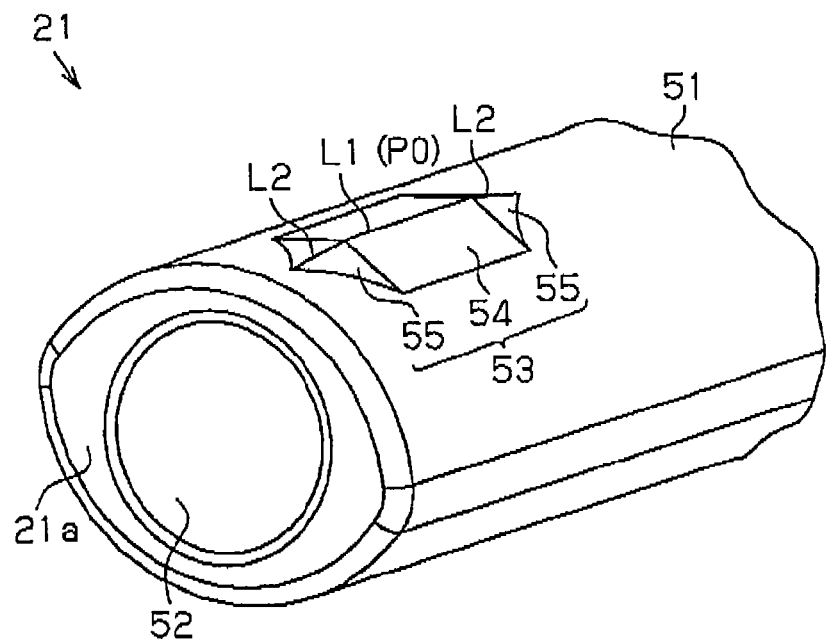
FIG. 9 is a perspective view drawing of a retaining member according to a first embodiment of the seat slide apparatus for a vehicle.

As FIG. 9, 10A, 10B, 11, 12 illustrate, each of edge surfaces 21a in the axial direction of each of the retaining members 21 is provided with a recess 52 for retaining the rolling element 20 having a curved surface similar to a half-sphere. Note that each of the recesses 52 for retaining the rolling element 20 serves as a retaining portion. On each of the facing surfaces 51 of each of the retaining members 21, protruding portions 53 are arranged to slidably contact with a corresponding rolling surface S at which the rolling element 20 rolls. Each of the protruding portions 53 arranged on the facing surfaces 51 is arranged at each end portion in a longitudinal direction of each of the retaining members 21. More specifically, each of the protruding portions 53 on each of the facing surfaces 51 is arranged at a position close to each of the recesses 52 for retaining the rolling element 20.

Figure 10A:
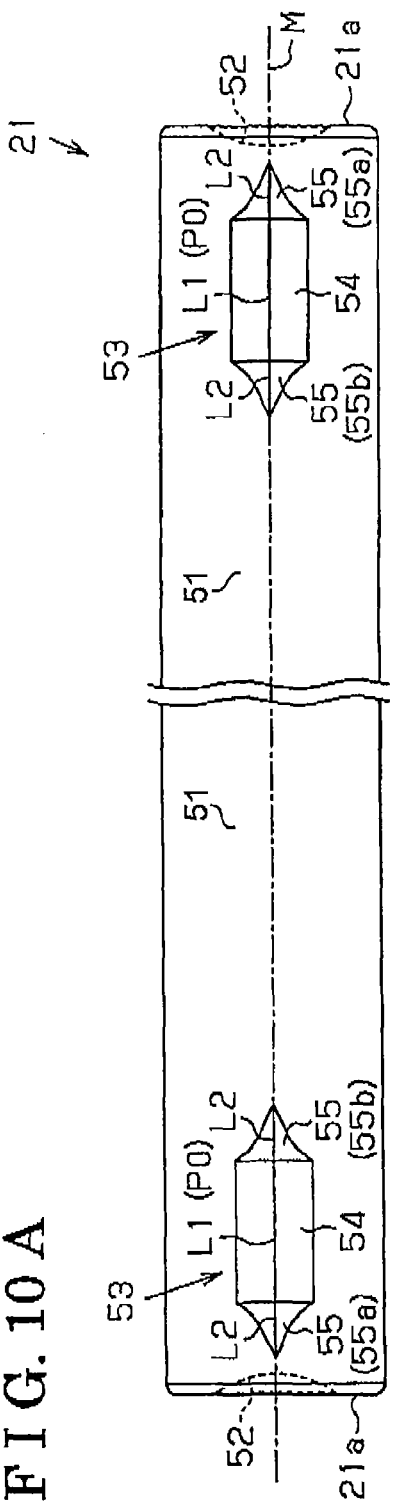
FIG. 10A is a top view drawing of the retaining member according to the first embodiment of the seat slide apparatus for a vehicle.
Figure 10B:
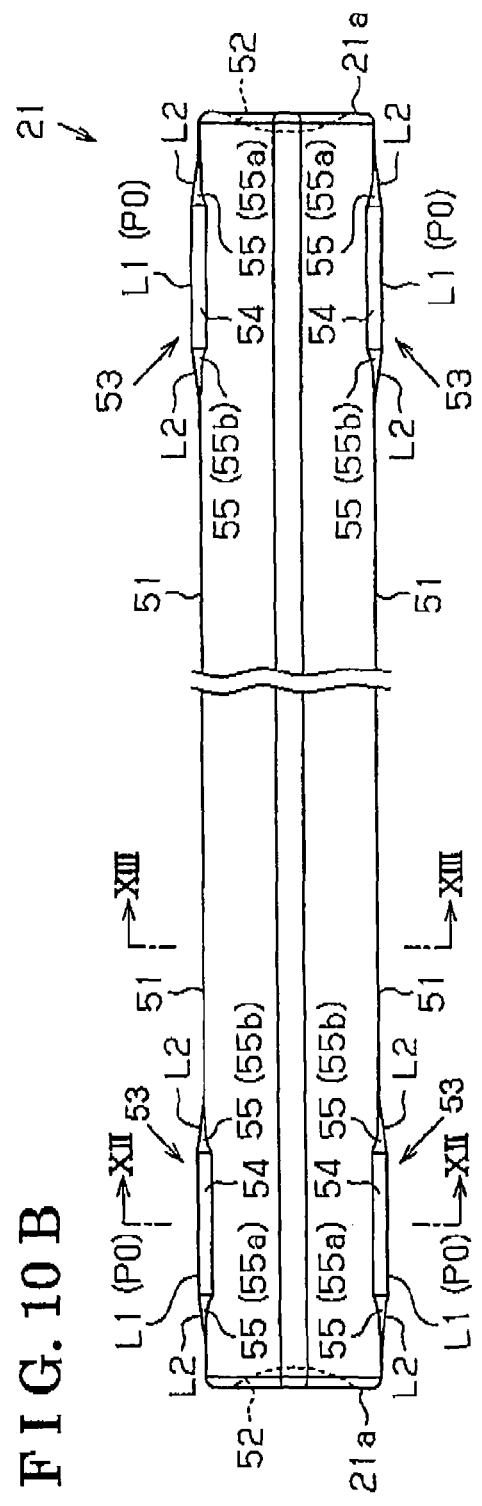
FIG. 10B is a side view drawing of the retaining member according to the first embodiment of the seat slide apparatus for a vehicle.

More specifically, as FIG. 10A, 10B, 15 illustrate, each of the protruding portions 53 includes an extending portion 54 that extends in a direction that conforms to a longitudinal direction of the retaining member 21 that is arranged to align with the extending direction of the lower rails 5 and the upper rails 6. In other words, the extending portion 54 extends in a direction that conforms to a path of the rolling element 20, the path formed on the rolling surface S at which the rolling element 20 rolls.

More specifically, as FIGS. 15 and 16 illustrate, each of the extending portions 54 is formed in a mountain form, which is a form having a cross sectional shape similar to a triangle where the cross section is taken in a direction that is perpendicular to the longitudinal direction of the retaining member 21. In other words, in a state where a width direction of the extending portion 54, which is rightward-leftward direction in FIG. 16, is defined as a direction that is perpendicular to an elongating direction of the retaining member 21 that conforms to the longitudinal direction of the retaining member 21, the extending portion 54 is formed such that a protruding height H1 of the extending portion 54 with reference to the facing surface 51 becomes shorter relative to a ridge line L1 towards each edge portion of the extending portion 54 in the width direction of the extending portion 54. The ridge line L1 is a peak portion of the aforementioned cross sectional shape similar to a triangle. Note that the ridge line L1 serves as a second ridge line portion.

Furthermore, each of the protruding portion 53 is arranged such that the ridge line L1 of the extending portion 54, which is formed in a mountain form, substantially aligns with a center line in a width direction of the facing surface 51, which is a position illustrated with an alternate long and short dash line M in FIGS. 15 and 10A. Note that, as FIG. 14 illustrates, in the seat slide apparatus 10 for a vehicle according to the first embodiment, each of the paths for the rolling element 20, which is formed on the curved and recessed surfaces Sa, Sb on the upper rails 6 and on the curved and recessed surfaces Sc, Sd on the lower rails 5, is arranged at a position substantially facing the center line of each of the facing surfaces 51 in the width direction. More specifically, each of the paths for the rolling element 20 is arranged on the rolling surface S at a position substantially facing the center line of each of the facing surfaces 51 in the width direction. Each of the protruding portions 53 is arranged to slidably contact with the rolling surface S at a portion of the protruding portion 53 that corresponds to the ridge line L1 of the extending portion 54, which is the top portion P0 where the protruding height H1 of the extending portion 54 is highest. The protruding portions 53 are arranged to slidably contact with the rolling surfaces S facing each other. More specifically, the protruding portions 53 are arranged to slidably contact with the curved and recessed surfaces Sa, Sb, Sc, Sd.

As FIG. 15 illustrates, a spreading portion 55 is arranged at each of end portions of each of the extending portions 54, the end portions that are in the elongating direction of the extending portions 54, which is leftward-rightward direction in FIG. 15. Each of the spreading portions 55 is arranged to extend continuously from the extending portion 54 in the longitudinal direction of the retaining member 21. Each of the spreading portions 55 tapers to a narrow end with an increasing distance from the extending portion 54 in the elongating direction.

Figure 17:
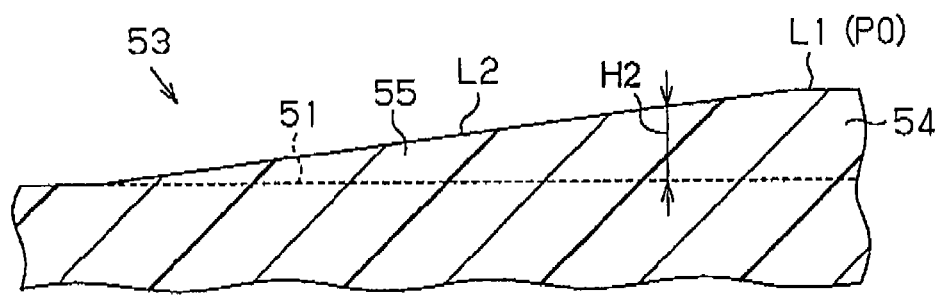
FIG. 17 is a cross-sectional view drawing of the protruding portion according to the first embodiment of the seat slide apparatus for a vehicle taken along line XVII-XVII in FIG. 11.

More specifically, as FIGS. 15 and 16 illustrate, each of the spreading portions 55 includes a ridge line L2 that extends continuously in the elongating direction from the ridge line L1 of the extending portion 54. The elongating direction is the direction that conforms to the path of the rolling element 20. Note that the ridge line L2 serves as a first ridge line portion. Furthermore, each of the spreading portions 55 is formed such that a cross-sectional shape taken in a direction perpendicular to the elongating direction is in a shape similar to a triangle, the triangle where a protruding height H2 of the spreading portion 55 becomes shorter relative to the ridge line L2 towards each edge portion of the spreading portion 55 in a width direction of the spreading portion 55. Furthermore, as FIG. 15 illustrates, the spreading portion 55 is formed such that a width W of the spreading portion 55 becomes smaller in the width direction of the spreading portion 55 with an increasing distance from the extending portion 54 in the elongating direction of the spreading portion 55. In other words, the spreading portion 55 is formed such that the spreading portion 55 tapers to a narrow end as the spreading portion 55 extends farther in the elongating direction. Furthermore, as FIG. 17 illustrates, the protruding height H2 of the spreading portion 55 becomes shorter with an increasing distance from the extending portion 54 in the elongating direction, which is leftward-rightward direction in FIG. 17. Accordingly, in the seat slide apparatus 10 for a vehicle according to the first embodiment, the foreign object that is present in the rolling path T is set aside to a side of the top portion P0 following a form of a sharp end form of the spreading portion 55. As a result, the foreign object may be removed from the path of the rolling element 20 that is formed on each of the rolling surfaces S.

An operation of the protruding portion 53 arranged with the above-mentioned arrangements will be described next. In a state where the lower rails 5 and the upper rails 6 move relative to each other in accordance with a seat sliding operation, positions of the retaining members 21 that retain the rolling elements 20 between the lower rails 5 and the upper rails 6 are seemingly displaced relative to the lower rails 5 and the upper rails 6. During the time of displacement, the foreign object in each of the rolling path T makes contact with each of the protruding portions 53 arranged on each of the retaining members 21. Note that the rolling path T is a space at which the rolling element 20 rolls between the lower rail 5 and the upper rail 6.

In a state where the foreign object makes contact with each of the protruding portions 53, the foreign object in each of the rolling paths T makes contact with the spreading portion 55, which is arranged on each end portion of each of the protruding portions 53. Accordingly, as FIG. 15 illustrates, the foreign object is set aside to a side of the top portion P0 following a form of either one of two slanted surfaces 55L, 55R that slant in different directions relative to the ridge line L2. Note that the top portion P0 is the portion arranged to slidably contact with the rolling surface S at which the rolling element 20 rolls. As a result, the foreign object is removed from the path at which the rolling element 20 rolls, the path that is formed on each of the rolling surfaces S.

Advantages of the seat slide apparatus 10 for a vehicle according to the first embodiment will be described next. Firstly, each of the retaining members 21 that retains the rolling element 20 between the lower rail 5 and the upper rail 6 includes the protruding portion 53 having the top portion P0 arranged to slidably contact with the rolling surface S at which the rolling element 20 rolls. The protruding portion 53 includes the spreading portion 55. The spreading portion 55 continuously extends from the top portion P0 in the longitudinal direction of the retaining member 21, which is the elongating direction that conforms to the path at which the rolling element 20 rolls, the path that is formed on the rolling surface S. The spreading portion 55 tapers to a sharp end form with an increasing distance from the top portion P0 in the elongating direction.

Upon the arrangement described herewith, in a state where the lower rails 5 and the upper rails 6 move relative to each other in accordance with a seat slide operation, the foreign object that is present in the rolling path T makes contact with the spreading portion 55 of the protruding portion 53 that is arranged on the retaining member 21. Note that the rolling path T is a space between the lower rail 5 and the upper rail 6 at which the rolling element 20 rolls. The foreign object is set aside to a side of the protruding portion 53 following the sharp end form of the spreading portion 55 so that the foreign object is removed from the path of the rolling element 20, the path that is formed on the rolling surface S. As a result, an adverse effect of the foreign object that is present between the lower rail 5 and the upper rail 6 is removed so that smooth rolling of the rolling element 20 is enhanced.

Secondly, the spreading portion 55 includes a ridge line L2 that extends continuously in the elongating direction that conforms to the path of the rolling element 20 from the ridge line L1 of the extending portion 54. Note that the ridge line L1 serves as the top portion P0. A cross-sectional shape of the spreading portion 55 taken in the direction that is perpendicular to the elongating direction is a shape similar to a triangle, the triangle having the protruding height H2 of the spreading portion 55 that becomes shorter relative to the ridge line L2 towards each edge portion of the spreading portion 55 in the width direction of the spreading portion 55. Furthermore, the spreading portion 55 is formed such that the spreading portion 55 becomes narrower in the width direction of the spreading portion 55 and the protruding height H2 of the spreading portion 55 becomes shorter with an increasing distance from the extending portion 54 in the elongating direction that conforms to the path of the rolling element 20. Upon the arrangement described herewith, the foreign object may be further effectively set aside to a side of the protruding portion 53. Accordingly, the foreign object may be more effectively removed from the path of the rolling element 20.

Thirdly, the protruding portion 53 is arranged close to the recess 52 for retaining the rolling element 20. In other words the protruding portion 53 is arranged at a peripheral portion of the recess 52 for retaining the rolling element 20. The recess 52 for retaining the rolling element 20, which serves as the retaining portion, is formed on each of the edge surfaces 21a in the axial direction of each of the retaining members 21. The spreading portion 55 of the protruding portion 53 is arranged at each end portion in the elongating direction of the extending portion 54. Note that the ridge line L1 serves as the top portion P0 in the extending portion 54.

Upon the arrangement described herewith, each of the protruding portions 53 includes a spreading portion 55a having the sharp end from facing toward the direction of the recess 52 for retaining the rolling element 20 that is closest to the spreading portion 55a and a spreading portion 55b having the sharp end form facing toward the direction opposite of the recess 52 for retaining the rolling element 20 that is closest to the spreading portion 55b, as FIGS. 10A and 10B illustrate. Accordingly, the foreign object in the rolling path T is furthermore effectively removed from the path of the rolling element 20.

For example, in a case where the lower rails 5 and the upper rails 6 of the seat slide apparatus 10 for a vehicle are applied with a coating, or a paint, the coating applied on the rolling surfaces S of the lower rails 5 and the upper rails 6 may be removed by a rolling movement of the rolling element 20. Nevertheless, the spreading portion 55a having the sharp end form facing toward the direction of the recess 52 for retaining the rolling element 20 that is closest to the spreading portion 55a may promptly set aside the foreign object that is produced as a result of the rolling movement of the rolling element 20 to a side of the protruding portion 53. By removing the foreign object from the path of the rolling element 20, the rolling element 20 is made to smoothly roll.

In another case with the seat slide apparatus 10 for a vehicle, a foreign object similar to dust or dirt that may enter the rolling path T from openings of the lower rails 5 and the upper rails 6. Nevertheless, the spreading portion 55b having the sharp end form facing toward the direction opposite of the recess 52 for retaining the rolling element 20 that is closest to the spreading portion 55b may set aside the foreign object before the foreign object reaches the recess 52 for retaining the rolling element 20. By removing the foreign object from the path of the rolling element 20, the rolling element 20 is made to smoothly roll.

The seat slide apparatus 10 for a vehicle according to a second embodiment will be described next. Arrangements for the second embodiment that are similar to the first embodiment are provided with the same reference numbers so that descriptions in detail of such arrangements will be omitted.

Figure 18:
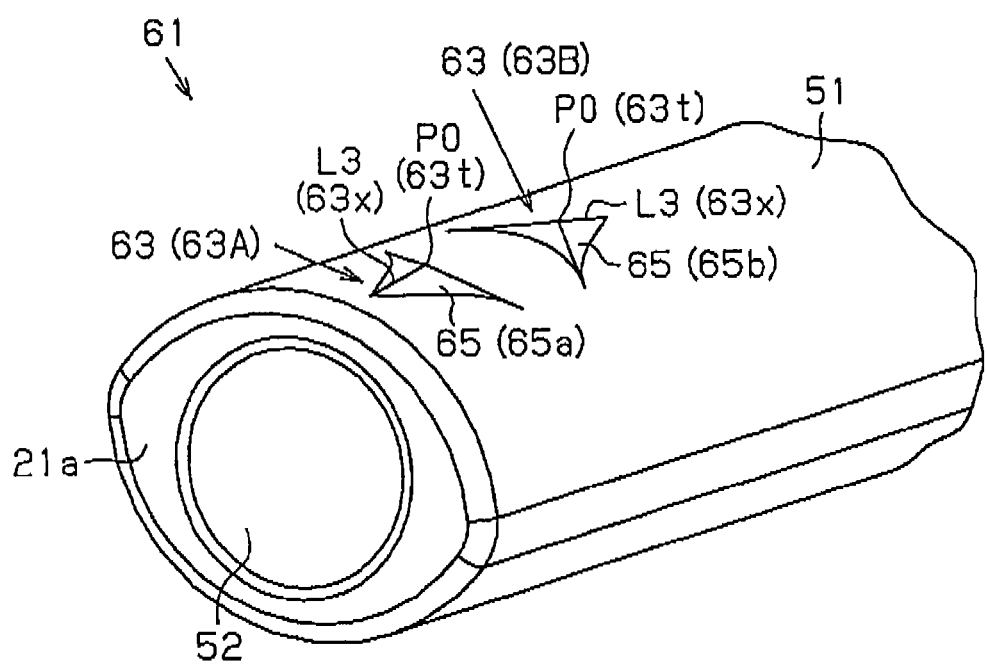
FIG. 18 is a perspective view drawing of a retaining member according to a second embodiment of the seat slide apparatus for a vehicle.

As FIGS. 18, 19A, and 19B illustrate, a retaining member 61 of the seat slide apparatus 10 for a vehicle according to the second embodiment differs from the retaining member 21 of the seat slide apparatus 10 for a vehicle according to the first embodiment in arrangements of protruding portions 63, which are either protruding portions 63A or protruding portions 63B. The protruding portions 63 are arranged on the facing surfaces 51 such that the top portions P0 of the protruding portions 63 are arranged to slidably contact with the rolling surfaces S at which the rolling element 20 rolls.

More specifically, the retaining member 61 of the seat slide apparatus 10 for a vehicle according to the second embodiment includes the protruding portion 63A and the protruding portion 63B at each end portion in the longitudinal direction of each facing surface 51. The protruding portion 63A is the protruding portion 63 with a spreading portion 65a having a sharp end form facing toward the direction of the recess 52 for retaining the rolling element 20 that is closest to the spreading portion 65a. The protruding portion 63B is the protruding portion 63 with a spreading portion 65b having a sharp end form facing toward the direction opposite of the recess 52 for retaining the rolling element 20 that is closest to the spreading portion 65b.

As FIGS. 19A, 19B, 20, and 21 illustrate, in the seat slide apparatus 10 for a vehicle according to the second embodiment, each of the protruding portions 63 having an exterior form similar to a three-sided pyramid erects on the facing surface 51. Note that the protruding portion 63 refers to either the protruding portion 63A or the protruding portion 63B.

Each of the protruding portions 63 is arranged such that a peak point 63t of the protruding portion 63 is arranged to slidably contact with the rolling surface S at which the rolling element 20 rolls. Note that the peak point 63t is one of peak points of the three-sided pyramid that serves as the top portion P0.

More specifically, in each of the protruding portions 63, a side 63x, which is one of sides of the tree-sided pyramid that connects to the top portion P0, is arranged such that the side 63x substantially coincide with the center line of the facing surface 51 in the width direction, which is the position indicated with an alternate long and short dash line M in FIG. 19A. Note that in the seat slide apparatus 10 for a vehicle according to the second embodiment, a bottom side 63y that is positioned skew to the side 63x is curved. Furthermore, each of the protruding portions 63 includes a spreading portion 65, which is either the spreading portion 65a or the spreading portion 65b. Each of the spreading portions 65 tapers to a sharp end form with an increasing distance from the top portion P0 in the elongating direction that conforms to a ridge line L3, which serves as the first ridge line portion. Note that the ridge line L3 is the side 63x that extends in a longitudinal direction of the retaining member 61.

Figure 20:
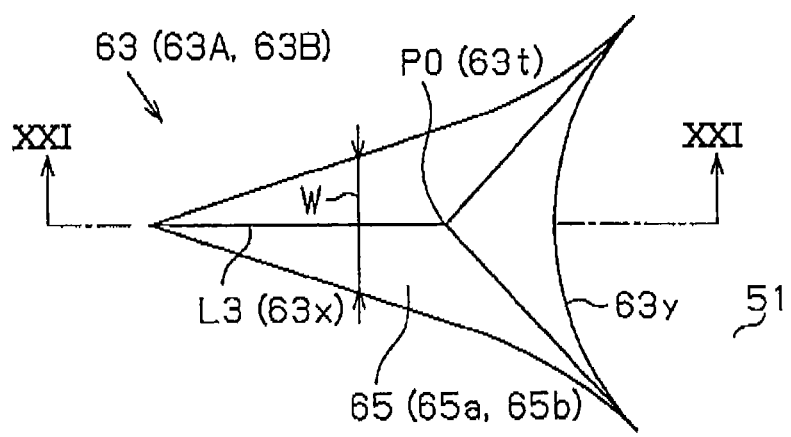
FIG. 20 is a top view drawing of the protruding portion according to the second embodiment of the seat slide apparatus for a vehicle.
Figure 21:
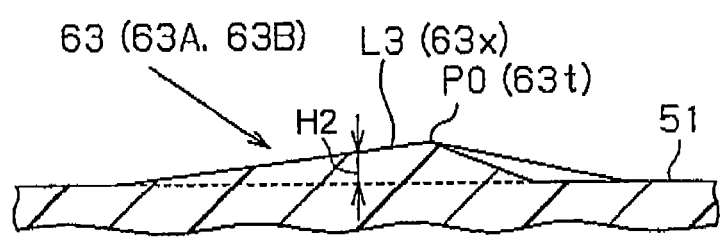
FIG. 21 is a cross-sectional view drawing of the retaining member according to the second embodiment of the seat slide apparatus for a vehicle taken along line XXI-XXI in FIG. 20.

In other words, similarly to the spreading portions 55 of the seat slide apparatus 10 for a vehicle according to the first embodiment, each of the spreading portions 65 of the seat slide apparatus 10 for a vehicle according to the second embodiment includes the ridge line L3 that extends in the longitudinal direction of the retaining member 61, which is the direction that conforms to the path of the rolling element 20. Furthermore, each of the spreading portions 65 is formed such that a cross-sectional shape taken in a direction perpendicular to the elongating direction of the spreading portion 65 is in a shape similar to a triangle, the triangle where a protruding height H2 of the spreading portion 65 becomes shorter relative to the ridge line L3 towards each edge portion of the spreading portion 65 in the width direction of the spreading portion 65, as FIG. 16 illustrates Furthermore, as FIG. 20 illustrates, the spreading portion 65 is formed such that a width W of the spreading portion 65 in the width direction becomes smaller with an increasing distance from the top portion P0 in the elongating direction of the spreading portion 65. In other words the spreading portion 65 is formed such that the spreading portion 65 tapers to a narrow end as the spreading portion 65 extends farther in the elongating direction of the spreading portion 65 from the top portion P0. Note that the elongating direction of the spreading portion 65 is leftward-rightward direction in FIG. 20. Furthermore, as FIG. 21 illustrates, the spreading portion 65 is formed such that the protruding height H2 of the spreading portion 65 becomes shorter with an increasing distance from the top portion P0 in the elongating direction, which is leftward-rightward direction in FIG. 21. Similarly to the protruding portions 53 of the seat slide apparatus 10 for a vehicle according to the first embodiment, each of the protruding portions 63 of the seat slide apparatus 10 for a vehicle according to the second embodiment, which is either the protruding portion 63A or the protruding portion 63B, is arranged to have a sharp end form so that the foreign object that is present in each of the rolling paths T is set aside to a side of the top portion P0. As a result, the foreign object may be removed from the path of the rolling element 20 that is formed on each of the rolling surfaces S.

Advantages similar to the advantages of the seat slide apparatus 10 for a vehicle according to the first embodiment may be obtained with the arrangement of the seat slide apparatus 10 for a vehicle according to the second embodiment. In the seat slide apparatus 10 for a vehicle according to the second embodiment, each of the protruding portions 63, which is either the protruding portion 63A or the protruding portion 63B, is arranged such that the peak point 63t is arranged to slidably contact with the rolling surface S at which the rolling element 20 rolls. Note that the peak point 63t is one of peak points of the three-sided pyramid of the protruding portion 63. Accordingly, the sliding resistance of the protruding portion 63 may be made to small so that a smooth movement of the lower rails 5 and the upper rails 6 relative to each other may be secured.

Furthermore, the peak point 63t, which serves as the top portion P0, is provided with a characteristic that allows the peak point 63t to resiliently deform easily. Accordingly, by arranging the peak point 63t in a pressure contact state with the sliding surface S, sliding resistance thereat may be easily adjusted to provide a comfortable operational feeling by providing a distinct control feeling to a seat slide operation.

The seat slide apparatus 10 for a vehicle according to a third embodiment will be described next. Arrangements for the third embodiment that are similar to the first embodiment and the second embodiment are provided with the same reference numbers so that descriptions in detail of such arrangements will be omitted.

Figure 22:
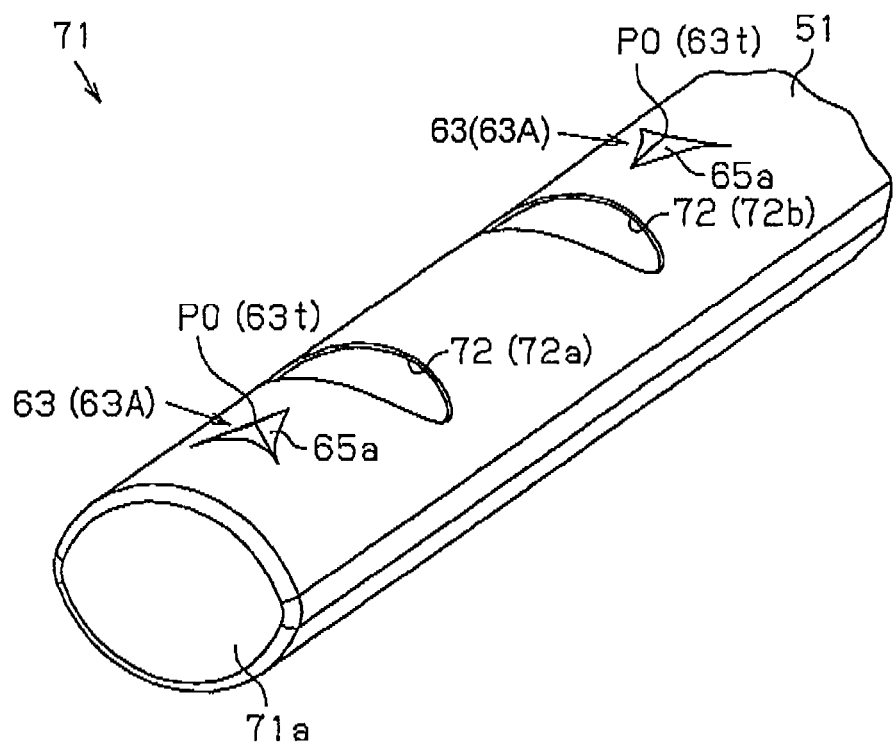
FIG. 22 is a perspective view drawing of a retaining member according to a third embodiment of the seat slide apparatus for a vehicle.
Figure 23A:
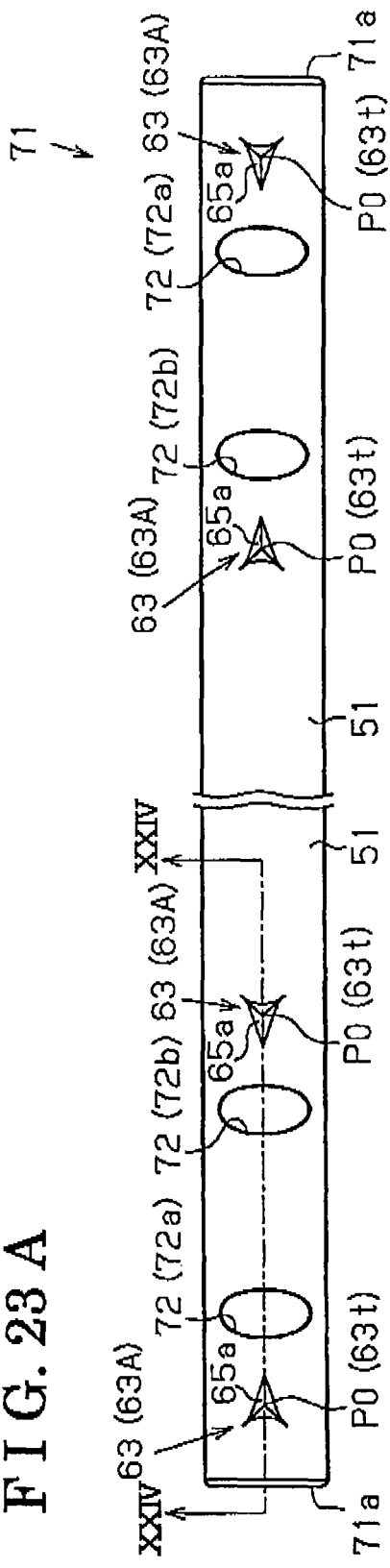
FIG. 23A is a top view drawing of the retaining member according to the third embodiment of the seat slide apparatus for a vehicle.
Figure 23B:
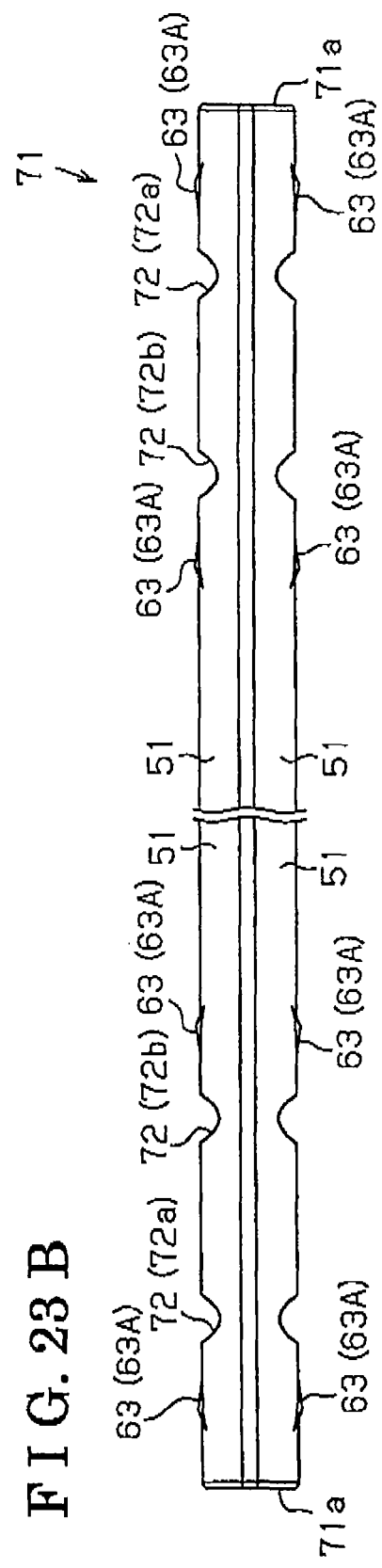
FIG. 23B is a side view drawing of the retaining member according to the third embodiment of the seat slide apparatus for a vehicle.

As FIGS. 22, 23A, and 23B illustrate, a retaining member 71 of the seat slide apparatus 10 for a vehicle according to the third embodiment is formed in an elongated stick form having a cross-sectional shape similar to an oval. Similarly to what FIG. 14 illustrates, each of the retaining members 71 of the seat slide apparatus 10 for a vehicle according to the third embodiment is arranged in each of the rolling paths T, which is formed between the lower rail 5 and the upper rail 6. Portions of each of the retaining members 71 where smaller curves are provided on a peripheral surface of the retaining member 71 become the facing surfaces 51 facing the rolling surfaces S at which the rolling element 20 rolls. Each of the curved and recessed surfaces Sa, Sb, Sc, Sd on the upper rails 6 and the lower rails 5 serves as the rolling surface S.

Unlike the retaining member 21 of the seat slide apparatus 10 for a vehicle according to the first embodiment and on the retaining member 61 of the seat slide apparatus 10 for a vehicle according to the second embodiment, each of the edge surfaces 71a in the axial direction of each of the retaining members 71 is not provided with the recess 52 for retaining the rolling element 20. Each of the retaining members 71 is provided with retaining through-holes 72, each of which extends through the facing surfaces 51. The retaining through-holes 72 are provided for retaining the rolling elements 20. Note that each of the retaining through-holes 72 serves as the retaining portion.

Figure 24:
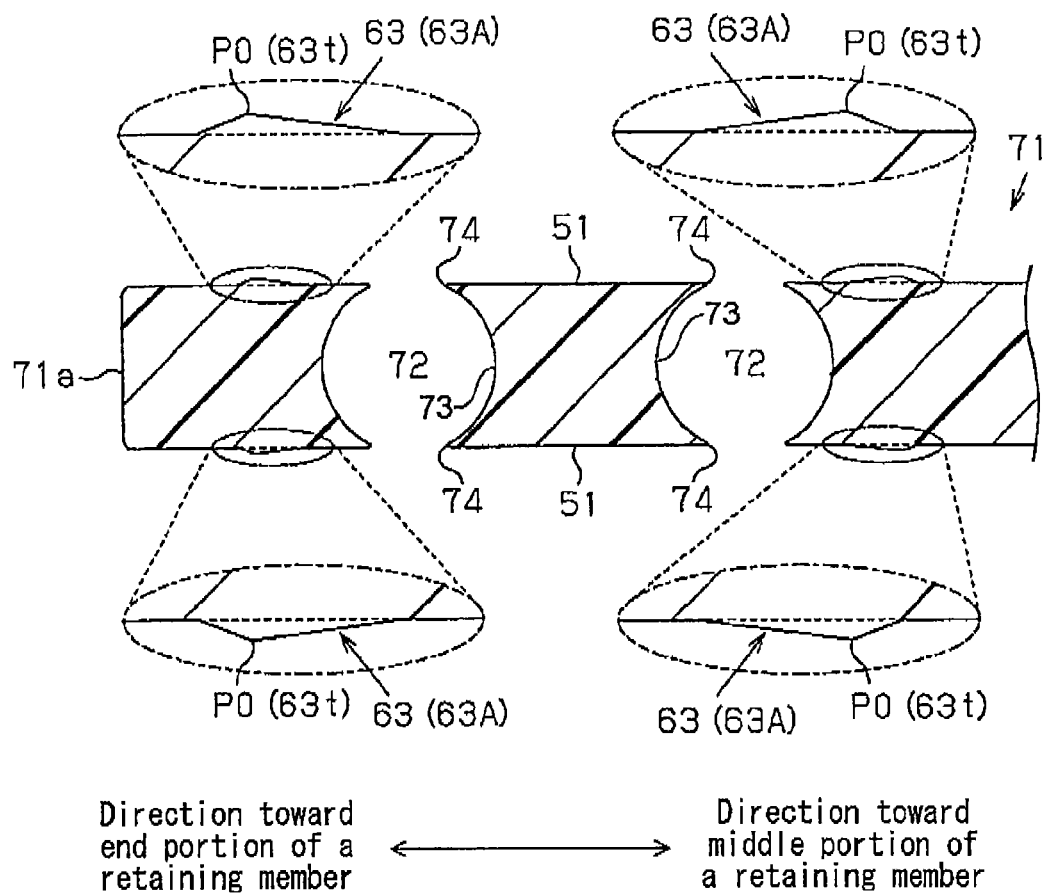
FIG. 24 is a cross-sectional view drawing of the retaining member according to the third embodiment of the seat slide apparatus for a vehicle taken along line XXIV-XXIV in FIG. 23A.

More specifically, in the seat slide apparatus 10 for a vehicle according to the third embodiment, two retaining through-holes 72 are provided on each end portion in the longitudinal direction of the retaining member 71. Two retaining through-holes 72, which are a retaining though-hole 72a and a retaining through-hole 72b, are arranged close to each other and separated by a space between each other in the longitudinal direction. As FIG. 24 illustrates, each of the retaining through-holes 72 is formed as a spherical seat 73 formed such that an internal wall surface of each of the retaining through-holes 72 substantially fits to a ball form of each of the rolling elements 20. Each of the retaining through-holes 72 contains the rolling element 20 inside to retain the rolling element 20 in a state where a surface portion of the rolling element 20 is exposed through an opening portion 74 formed on each of the facing surfaces 51. Each of the rolling elements 20 is retained at the retaining through-hole 72 in a state where the rolling element 20 may freely rotate thereat.

Furthermore, as FIGS. 22 to 24 illustrate, the retaining member 71 of the seat slide apparatus 10 for a vehicle according to the third embodiment includes protruding portions 63, each of which is formed in a form similar to a three-sided pyramid, similarly to the seat slide apparatus 10 for a vehicle according to the second embodiment. Each of the protruding portions 63 is arranged such that the peak point 63t of the protruding portions 63 is arranged to slidably contact with the rolling surface S at which the rolling element 20 rolls. Note that the peak point 63t is one of peak points of the three-sided pyramid that serves as the top portion P0.

More specifically, each of the retaining members 71 includes a multiple number of protruding portions 63A. Each of the protruding portions 63A includes a spreading portion 65a having a sharp end form facing toward a direction of the retaining through-hole 72 that is closest to the spreading portion 65a, which is either the retaining through-hole 72a or the retaining through-hole 72b. For each of the retaining through-holes 72, which is either the retaining through-hole 72a or the retaining through-hole 72b, one protruding portion 63, which is the protruding portion 63A, is provided at a position close to, which is at a peripheral portion of, the corresponding retaining through-hole 72, which is either the retaining through-hole 72a or the retaining through-hole 72b.

More specifically, in the seat slide apparatus 10 for a vehicle according to the third embodiment, one of the protruding portions 63, which is the protruding portion 63A, is arranged at a position in the direction closer to the end portion of the retaining member 71 in the longitudinal direction relative to the retaining through-hole 72a and another one of the protruding portions 63, which is the protruding portion 63A, is arranged at a position in the direction closer to a middle portion of the retaining member 71 in the longitudinal direction relative to the retaining though-hole 72b. Note that the retaining through-hole 72a is the retaining through-hole 72 arranged at a position in the direction closer to the end portion of the retaining member 71, which is a leftward retaining through-hole 72 in FIG. 24. Note that the retaining through-hole 72b is the retaining through-hole 72 arranged at a position in the direction closer to the middle portion of the retaining member 71, which is a rightward retaining through-hole 72 in FIG. 24. Upon the arrangement described herewith, in the seat slide apparatus 10 for a vehicle according to the third embodiment, the foreign object that is present in the rolling path T is set aside to a side of the top portion P0 following the sharp end form of the protruding portion 63A, which is a spreading portion 55a, so that the foreign object may be removed from the path of the rolling element 20, the path that is formed on the rolling surface S.

The seat slide apparatus 10 for a vehicle according to a fourth embodiment will be described next. Arrangements for the fourth embodiment that are similar to the first to the third embodiments are provided with the same reference numbers so that descriptions in detail of such arrangements will be omitted.

Figure 25:
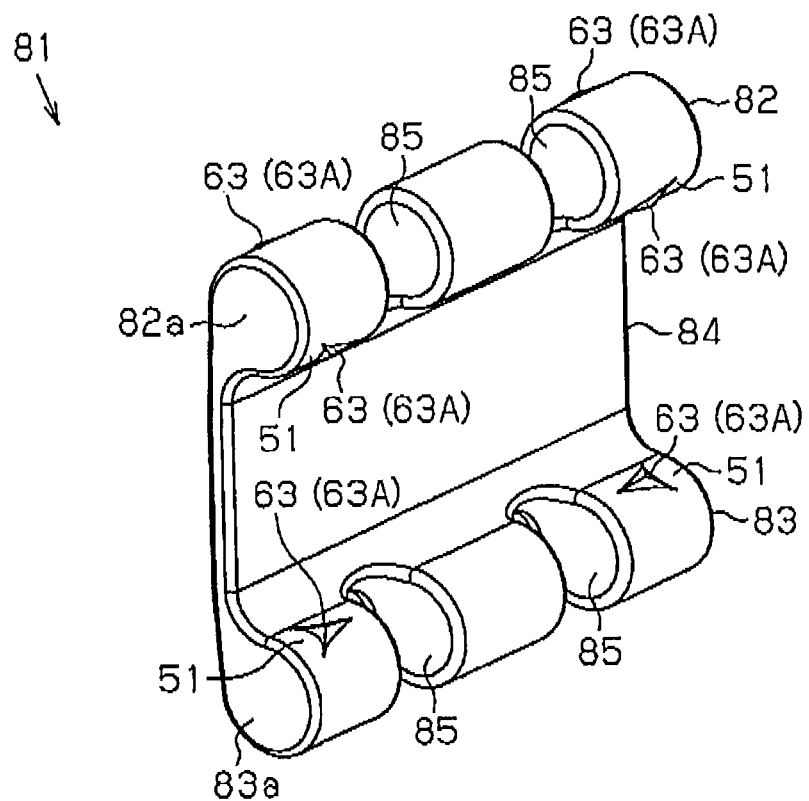
FIG. 25 is a perspective view drawing of a retaining member according to a forth embodiment of the seat slide apparatus for a vehicle.
Figure 26:
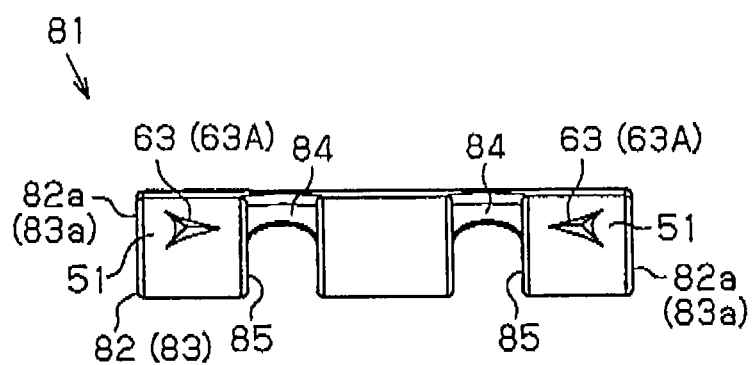
FIG. 26 is a top view drawing of the retaining member according to the fourth embodiment of the seat slide apparatus for a vehicle.
Figure 27:
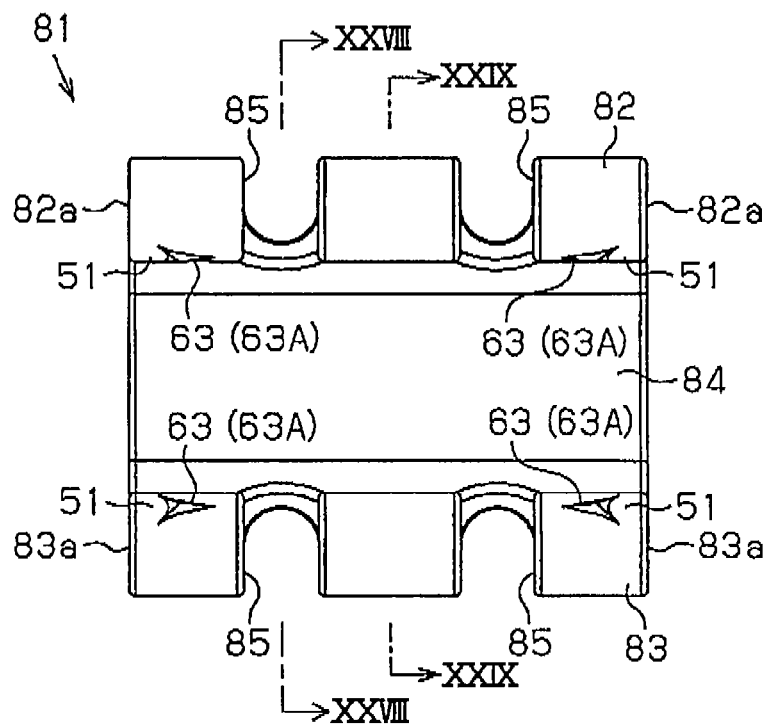
FIG. 27 is a side view drawing of the retaining member according to the fourth embodiment of the seat slide apparatus for a vehicle.

As FIGS. 25 to 27 illustrate, each of the retaining members 81 of the seat slide apparatus 10 for a vehicle according to the fourth embodiment includes holder portions 82, 83 and a connecting portion 84. Each of the holder portions 82, 83 is formed in a form similar to a stick. The holder portions 82, 83 are arranged parallel to each other in two rows. The connecting portion 84 is formed in a form similar to a flat plate. The connecting portion 84 connects between the holder portion 82 and the holder portion 83.

On each of the holder portions 82, 83, rolling element retaining portions 85 configured to contain the rolling elements 20 therein are formed. Each of the rolling element retaining portions 85 is formed by cutting out a portion of each of the holder portions 82, 83 in a direction that is perpendicular to the longitudinal direction of the holder portions 82, 83. Note that, each of the rolling element retaining portions 85 serves as the retaining portion. In the seat slide apparatus 10 for a vehicle according to the fourth embodiment, each of the holder portions 82, 83 is provided with two rolling element retaining portions 85. Each of the holder portions 82, 83 is arranged such that each of the holder portions 82, 83 retains the rolling element 20 in the rolling element retaining portions 85 in a state where a surface of each of the rolling elements 20 is exposed from an open portion of each of the rolling element retaining portions 85.

Figure 28:
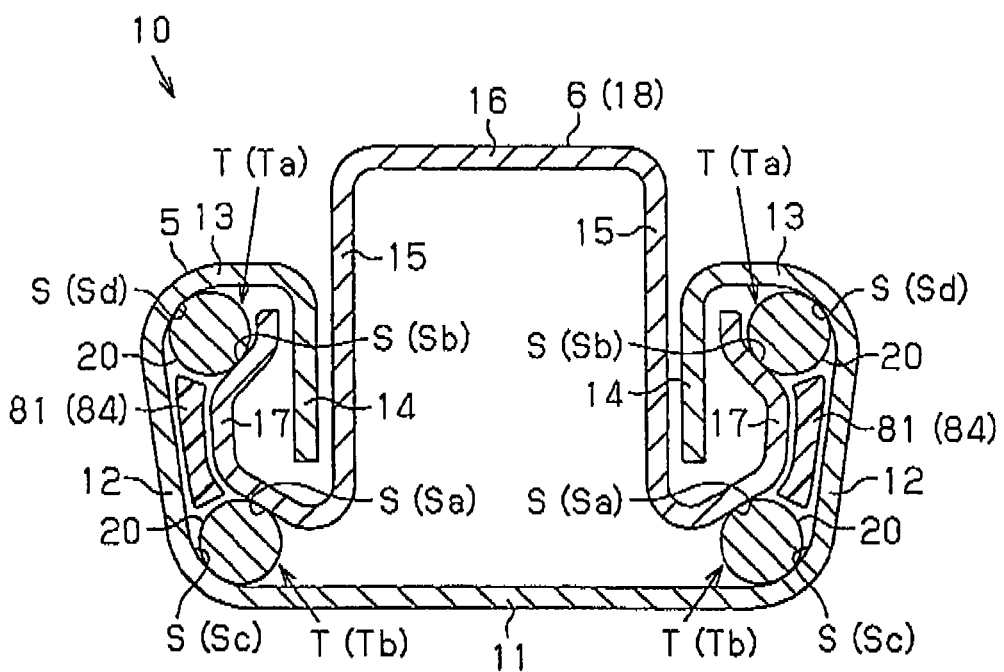
FIG. 28 is a cross-sectional view drawing of the retaining member according to the fourth embodiment of the seat slide apparatus for a vehicle taken along line FIG. 27.
Figure 29:
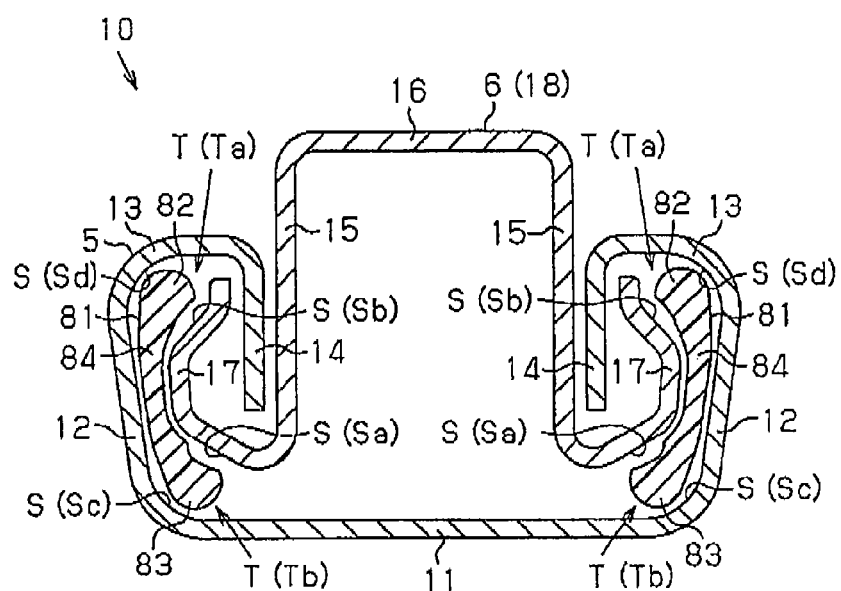
FIG. 29 is a cross-sectional view drawing of the retaining member according to the fourth embodiment of the seat slide apparatus for a vehicle taken along line XXIX-XXIX in FIG. 27.

As FIGS. 28 and 29 illustrate, each of the retaining members 81 of the seat slide apparatus 10 for a vehicle according to the fourth embodiment is arranged between the outer wall 12 of the lower rail 5 and the folded portion 17 of the upper rail 6. Upon the arrangements described herewith, the holder portion 82, which is one of the holder portions 82, 83, is arranged in a rolling path Ta, which is one of the rolling paths T. The rolling path Ta is formed between each of the curved and recessed surfaces Sb formed on the upper rail 6 and each of the curved and recessed surfaces Sd formed on the lower rail 5. The holder portion 83, which is the other one of the holder portions 82, 83, is arranged in a rolling path Tb, which is one of the rolling paths T. The rolling path Tb is formed between each of the curved and recessed surfaces Sa formed on the upper rails 6 and each of the curved and recessed surfaces Sc formed on the lower rail 5.

More specifically, each of the retaining members 81 of the seat slide apparatus 10 for a vehicle according to the fourth embodiment retains the rolling elements 20 in a multiple number of rolling paths T, which are the rolling paths Ta, Tb formed between the lower rail 5 and the upper rail 6. Furthermore, each of the holder portions 82, 83 of the retaining member 81, each of which is formed in a stick form, is arranged in the rolling path T, which are the rolling path Ta and the rolling path Tb, such that each of the holder portions 82, 83 is arranged to conform to the extending direction of the rolling paths T, which are the rolling path Ta and the rolling path Tb. Note that the extending direction refers to the direction that is perpendicular to the surface where FIGS. 28 and 29 are drawn, which is the extending direction of the lower rail 5 and the upper rail 6. Accordingly, in a state where the lower rails 5 and the upper rails 6 move relative to each other in accordance with a seat slide operation, the rolling elements 20, which are contained in the rolling element retaining portions 85 of each of the retaining members 81, roll on the paths formed on the rolling surfaces S. Note that each of the curved and recessed surfaces Sa, Sb of the upper rail 6 and each of the curved and recessed surfaces Sc, Sd of the lower rail 5 serves as the rolling surface S.

In the seat slide apparatus 10 for a vehicle according to the fourth embodiment, each of the curved and recessed surfaces Sa, Sb formed on the upper rail 6 that forms a rolling path T is provided with a small curve. In other words, the curved form of each of the curved and recessed surfaces Sa, Sb is formed in a form similar to a flat plate. Furthermore, the retaining members 81 are arranged at multiple positions, for example at two positions, in the longitudinal direction of the lower rail 5 and the upper rail 6. Two positions are separated by a space in the longitudinal direction. Furthermore, the retaining members 81 are provided as leftward-rightward pairs between the lower rail 5 and the upper rail 6. As a result, smooth relative movements between the lower rails and the upper rails 6 in the extending direction are secured.

Figure 30:
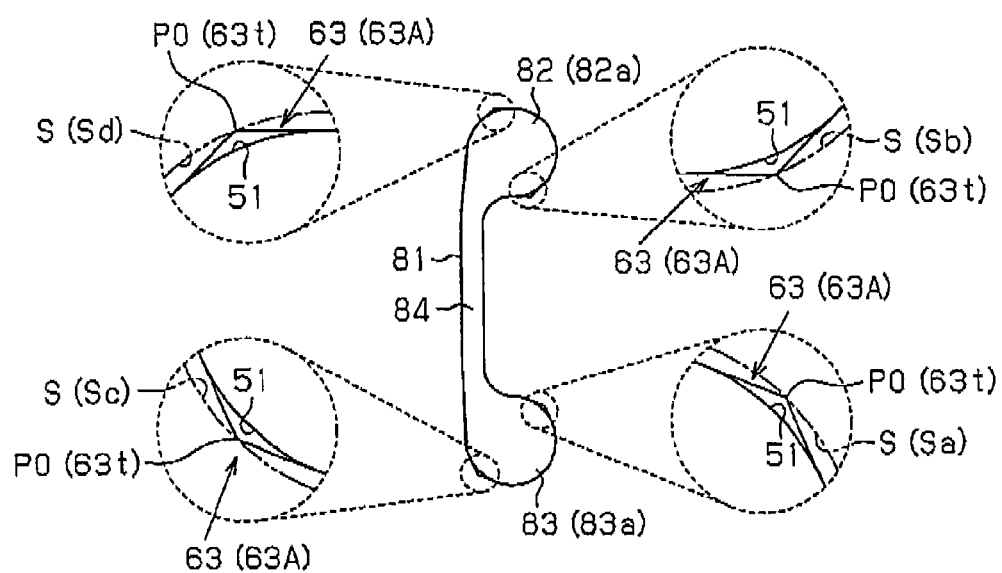
FIG. 30 is a front view drawing of the retaining member according to the fourth embodiment of the seat slide apparatus for a vehicle.

Furthermore, as FIG. 30 illustrates, each of the retaining members 81 of the seat slide apparatus 10 for a vehicle according to the fourth embodiment includes the protruding portions 63 similar to the protruding portions 63 of the retaining members 71 of the seat slide apparatus 10 for a vehicle according to the third embodiment. The protruding portions 63 of the seat slide apparatus for a vehicle according to the fourth embodiment are arranged on the facing surfaces 51 of the holder portions 82, 33, the facing surfaces 51 facing the rolling surfaces S. In other words, each of the facing surfaces 51 refers to an outer surface portion of each of the retaining members 81 that faces any one of the curved and recessed portions Sa, Sb formed on the upper rail 6 and the curved and recessed portions Sc, Sd formed on the lower rail 5, the curved and recessed portions Sa, Sb, Sc, Sd that form the rolling paths T.

More specifically, each of the facing surfaces 51 of each of the holder portions 82, 83 is provided with the protruding portion 63 formed in a form similar to a three-sided pyramid. Each of the protruding portions 63 is arranged such that the peak point 63t of the protruding portion 63 is arranged to slidably contact with the rolling surface S at which the rolling element 20 rolls. Note that the peak point 63t is one of peak points of the three-sided pyramid, the peak point that serves as the top portion P0. More specifically, each of the facing surfaces 51 of each of the holder portions 82, 83 is provided with a multiple number of protruding portions 63, which are the protruding portions 63A. Each of the protruding portions 63A includes the spreading portion 65a with the sharp end form facing toward the direction of the rolling element retaining portion 85 that is closest to the spreading portion 65a.

More specifically, as FIGS. 25 to 27 illustrate, each of the facing surfaces 51 of the holder portions 82, 83 is provided with one protruding portion 63, which is the protruding portion 63A, at a position that is close to an end surface 82a of the holder portion 82 and one protruding portion 63, which is the protruding portion 63A, at a position that is close to an end surface 83a of the holder portion 83. Note that the end surfaces 82a, 83a refer to the surfaces that are in the axial direction of the holder portions 82, 83. Accordingly, in the seat slide apparatus 10 for a vehicle according to the fourth embodiment, the foreign object that is present in the rolling path T is set aside to a side of the top portion P0 following the sharp end form of the protruding portion 63A so that the foreign object may be removed from the path of the rolling element 20, the path that is formed on the rolling surface S.

Figure 31A:
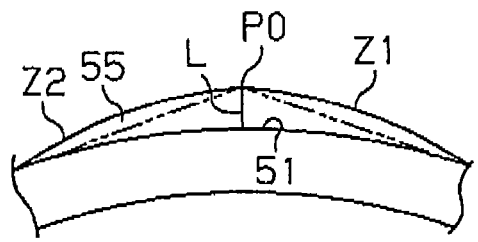
FIG. 31A is a front view drawing illustrating an alternative form of a spreading portion.
Figure 31B:
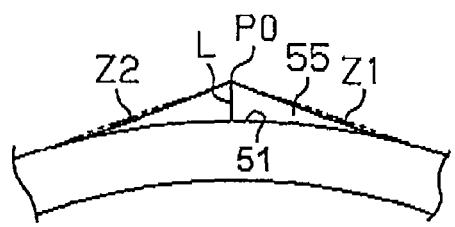
FIG. 31B is a front view drawing illustrating another alternative form of the spreading portion.

The seat slide apparatus 10 for a vehicle according to the first to the fourth embodiments may be altered in following manners. In each of the aforementioned embodiments of the seat slide apparatus 10 for a vehicle, each of the spreading portions 55, 65 is formed to have a cross-sectional shape similar to a triangle, the cross-sectional shape that is taken in the direction perpendicular to the elongating direction of each of the spreading portions 55, 65, such that the protruding height H2 of the spreading portions 55, 65 becomes shorter relative to the ridge line L2 or the ridge line L3 towards edge portions of the spreading portion 55, 56 in the width direction of the spreading portion 55, 65. Nevertheless, the cross-sectional shape taken in the direction perpendicular to the elongating direction of each of the spreading portions 55, 65 or a front view shape that corresponds to the cross-sectional shape of each of the spreading portions 55, 65 is not limited to such. Each of two visible outlines forming a mountain shape of the triangle may be curved. As an alternative, as FIG. 31A illustrates, each of the spreading portions 55, 65 may be provided with the front view shape having outwardly bulging two visible outlines Z1, Z2. Furthermore, as an alternative, as FIG. 31B illustrates, each of the spreading portions 55, 65 may be provided with the front view shape having inwardly bulging two visible outlines Z1, Z2. Note that, broken lines in FIGS. 31A and 31B illustrate reference lines relative to the aforementioned visible outlines Z1, Z2. Each of the reference lines indicates a state where two visible outlines are formed by straight lines.

In each of the aforementioned embodiments of the seat slide apparatus 10 for a vehicle, each of the spreading portions 55, 65 is described to have the ridge line L2 or the ridge line L3 that serves as the first ridge line portion that extends in the direction that conforms to the path of the rolling element 20. The first ridge line portion may or may not be a sharply defined ridge line. For example, the first ridge line portion may be formed to have a certain amount of width or may be in a rounded form.

Figure 32:
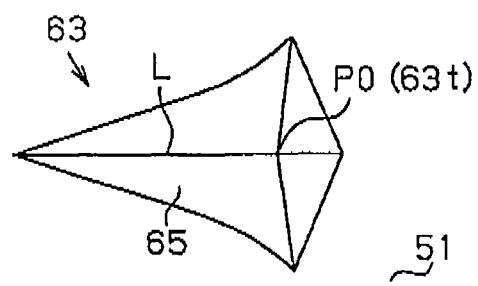
FIG. 32 is a top view drawing illustrating an alternative form of the protruding portion.

In the seat slide apparatus 10 for a vehicle according to the second to the fourth embodiments, each of the protruding portions 63 is formed in a form similar to a three-sided pyramid, however, the form of the protruding portion 63 is not limited to the form similar to the three-sided pyramid. The form of the protruding portion 63 may be in other types of pyramid form provided that the protruding portion 63 is arrange such that the peak point 63t of the protruding portion 63 is arranged to slidably contact with the rolling surface S at which the rolling element 20 rolls and the protruding portion 63 includes a spreading portion 65 having a ridge line L, which serves as the first ridge line portion, that extends in the direction that conforms to the path of the rolling element 20. Note that the peak point 63t is one of peak points of the pyramid form, the peak point that serves as the top portion P0. For example, the form of the protruding portions 63 may be in a four-sided pyramid as illustrated in FIG. 32. In FIG. 32, leftward-rightward direction is the direction that conforms to the path of the rolling element 20. Furthermore, the form of each of the protruding portions 63 may be in a more complex pyramid form.

In the seat slide apparatus 10 for a vehicle according to the second embodiment, the retaining member 61 includes the protruding portion 63A having the spreading portion 65a with the sharp end form facing toward the direction of the recess 52 for retaining the rolling element 20 that is closest to the spreading portion 65a and the protruding portion 63B having the spreading portion 65b with the sharp end form facing toward the direction opposite of the recess 52 for retaining the rolling element 20 that is closest to the spreading portion 65b. Furthermore, in the seat slide apparatus 10 for a vehicle according to the third and the fourth embodiments, each of the retaining members 71, 81 includes the protruding portion 63A having the spreading portion 65a with the sharp end form facing toward the direction of either the retaining through-hole 72 or the rolling element retaining portion 85, each of which serves as the retaining portion, however, each of the retaining members 71, 81 does not include the protruding portions 63B. An alternative arrangement for the seat slide apparatus 10 for a vehicle according to the second to the fourth embodiments includes the arrangement where the protruding portions 63B are provided but not the protruding portions 63A. In other words, the sharp end form of each of the spreading portions, which is the spreading portion 65b, is facing the direction opposite of the retaining portion that is closest to the spreading portion 65b.

As an alternative arrangement for the seat slide apparatus 10 for a vehicle according to the second embodiment, which is an embodiment where the rolling elements 20 are retained at positions outside the retaining member 21 at the recess 52 for retaining the rolling element 20 provided at end surfaces 21a in the axial direction of the retaining member 21, the seat slide apparatus 10 for a vehicle may be provided with the protruding portions 63A alone. Note that each of the protruding portions 63A includes the spreading portion 65a having the sharp end form facing toward the direction of the retaining portion that is closest to the spreading portion 65a, which is the recess 52 for retaining the rolling element 20. Furthermore, as an alternative arrangement for the seat slide apparatus 10 for a vehicle according to the third and the fourth embodiment, each of which is an embodiment of the seat slide apparatus 10 for a vehicle where the rolling elements 20 are retained within the retaining member 71, 81 where the retaining member 71 retains the rolling elements 20 at the retaining through-holes 72 and the retaining member 81 retains the rolling elements 20 at the rolling element retaining portions 85, the seat slide apparatus 10 for a vehicle may be provided with each of the protruding portion 63A and the protruding portion 63B, the protruding portions having the sharp end form facing opposite directions. Note that the protruding portions 63A includes the spreading portion 65a with the sharp end form facing toward the direction of the retaining portion that is closest to the spreading portion 65a and the protruding portions 63B includes the spreading portion 65b with the sharp end form facing toward the direction opposite of the retaining portion that is closest to the spreading portion 65b.

Similarly, the seat slide apparatus 10 for a vehicle according to the first embodiment may be provided with the extending portion 54 having the spreading portion 55 arranged at one end portion in the elongating direction of the extending portion 54 alone. Furthermore, exact position and number of protruding portions to be provided for each embodiment may be altered appropriately.

Furthermore a form of the spreading portion 55, 55a, 55b, 65, 65a, 65b, which is described as a form that tapers to a sharp end form, may be altered appropriately. Technical ideas and advantages upon the arrangements of the above-described embodiments of the seat slide apparatus 10 for a vehicle will be described next.

The protruding portion 53, 63, 63A, 63B is characterized by being arranged close to the retaining through-hole 72. The retaining member 21, 61, 71, 81 is characterized by retaining a multiple number of rolling elements 20 at positions separated by a space in the extending direction of the lower rail 5 and the upper rail 6.

The protruding portion 53, 63, 63A, 63B is characterized by having the spreading portion 55, 55a, 65, 65a with the sharp end form of the spreading portion 55, 55a, 65, 65a facing toward the direction of the retaining portion for retaining the rolling element 20, the retaining portion that is closest to the spreading portion 55, 55a, 65, 65a. Furthermore, the protruding portion 53, 63, 63A, 63B is characterized by having the spreading portion 55b, 65b with the sharp end form of the spreading portion 55b, 65b facing toward the direction opposite of the retaining portion for retaining the rolling element 20, the retaining portion that is closest to the spreading portion 55b, 65b. Note that each of the recess 52 for retaining the rolling element 20, the retaining through-hole 72, and the rolling element retaining portion 85 serves as the retaining portion.

Upon each of the arrangements described herewith, the foreign object may be further effectively removed from the path of the rolling element 20. Furthermore, the retaining member is characterized by retaining the rolling element 20 in a plurality of rolling paths T, Ta, Tb that are formed between the lower rail 5 and the upper rail 6.

The retaining member 71, 81 is characterized by containing the rolling elements 20 within the retaining portion.

According to an aspect of this disclosure, a seat slide apparatus 10 for a vehicle includes an upper rail 6 retaining a seat 1 above the upper rail 6, a lower rail 5 retaining the upper rail 6 in a state where the upper rail 6 moves relative to the lower rail 5, a rolling element 20 arranged between the lower rail 5 and the upper rail 6, and a retaining member 21, 61, 71, 81 configured to retain the rolling element 20 between the lower rail 5 and the upper rail 6, the retaining member 21, 61, 71, 81 including a protruding portion 53, 63, 63A, 63B having a top portion P0 arranged to slidably contact with a rolling surface S at which the rolling element 20 rolls. The protruding portion 53, 63, 63A, 63B includes a spreading portion 55, 55*a*, 55*b*, 65, 65*a*, 65*b* extending from the top portion P0 in an elongating direction, the elongating direction conforming to a path of the rolling element 20 formed on the rolling surface S, the spreading portion 55, 55*a*, 55*b*, 65, 65*a*, 65*b* tapering to a sharp end form with an increasing distance from the top portion P0 in the elongating direction, the spreading portion 55, 55*a*, 55*b*, 65, 65*a*, 65*b* configured to remove a foreign object from the path.

Upon the arrangement described herewith, the seat slide apparatus 10 for a vehicle may remove an adverse effect of the foreign object that is present between the lower rail 5 and the upper rail 6 so that the rolling element 20 may smoothly roll. In a state where the lower rails 5 and the upper rails 6 move relative to each other in accordance with a seat slide operation, the foreign object that is present in a rolling path T makes contact with the spreading portion 55, 55*a*, 55*b*, 65, 65*a*, 65*b* of the protruding portion 53, 63, 63A, 63B that is arranged on the retaining member 21, 61, 71, 81. Note that the rolling path T is a space between the lower rail 5 and the upper rail 6 where the rolling element 20 rolls. The foreign object is set aside to a side of the protruding portion 53, 63, 63A, 63B following a form of the sharp end form of the spreading portion 55, 55*a*, 55*b*, 65, 65*a*, 65*b* so that the foreign object is removed from the path of the rolling element 20, the path that is formed on the rolling surface S. By removing the adverse effect of the foreign object that is present between the lower rail 5 and the upper rail 6, a smooth rolling of the rolling element 20 may be enhanced.

According to another aspect of this disclosure, the spreading portion 55, 55*a*, 55*b*, 65, 65*a*, 65*b* of the seat slide apparatus 10 for a vehicle is formed to have the sharp end form including a first ridge line portion (a ridge line L, L2, L3) extending from the top portion P0 in the elongating direction. A protruding height H2 of the spreading portion 55, 55*a*, 55*b*, 65, 65*a*, 65*b* becomes shorter relative to the first ridge line portion towards each edge portion of the spreading portion 55, 55*a*, 55*b*, 65, 65*a*, 65*b* in a width direction of the spreading portion 55, 55*a*, 55*b*, 65, 65*a*, 65*b*. The spreading portion 55, 55*a*, 55*b*, 65, 65*a*, 65*b* becomes narrower in the width direction and the protruding height H2 of the spreading portion 55, 55*a*, 55*b*, 65, 65*a*, 65*b* becomes shorter with an increasing distance from the top portion P0 in the elongating direction.

Upon the arrangement described herewith, the foreign object may be further effectively set aside to a side of the protruding portion 53, 63, 63A, 63B. Accordingly, the foreign object may be further effectively removed from the path of the rolling element 20.

According to further aspect of this disclosure, the retaining member 21, 61, 71, 81 of the seat slide apparatus 10 for a vehicle includes a retaining portion (the recess 52 for retaining the rolling element 20, a retaining through-hole 72, a rolling element retaining portion 85) retaining the rolling element 20. Furthermore, the protruding portion 53, 63 includes the spreading portion 55, 55*a*, 65, 65*a* having the sharp end form facing toward a direction of the retaining portion retaining the rolling element 20, the retaining portion that is closest to the spreading portion 55, 55*a*, 65, 65*a*.

Upon the arrangement described herewith, the spreading portion 55, 55*a*, 65, 65*a* includes the sharp end form facing toward the direction of the retaining portion (the recess 52 for retaining the rolling element 20, the retaining through-hole 72, the rolling element retaining portion 85) retaining the rolling element 20, the retaining portion that is closest to the spreading portion 55, 55*a*, 65, 65*a*. Accordingly, the spreading portion 55, 55*a*, 65, 65*a* may promptly set aside a foreign object that is produced by a rolling movement of the rolling element 20 to the side of the protruding portion 53, 63, 63A. Note that an example of such foreign object is a paint that came off from the upper rail 6 or the lower rail 5 as a result of the rolling movement of the rolling element 20 on the upper rail 6 or the lower rail 5. By removing the foreign object from the path of the rolling element 20, the rolling element 20 is made to smoothly roll.

According to another aspect of this disclosure, the retaining member 21, 61, 71, 81 of the seat slide apparatus 10 for a vehicle includes a retaining portion (the recess 52 for retaining the rolling element 20, a retaining through-hole 72, a rolling element retaining portion 85) retaining the rolling element 20. Furthermore, the protruding portion 53, 63, 63A, 63B includes the spreading portion 55*b*, 65*b* having the sharp end form facing toward a direction opposite of the retaining portion retaining the rolling element 20, the retaining portion that is closest to the spreading portion 55, 55*a*, 55*b*, 65, 65*a*, 65*b*.

Upon the arrangement described herewith, the spreading portion 55*b*, 65*b* includes a sharp end form facing toward a direction opposite of the retaining portion (the recess 52 for retaining the rolling element 20, a retaining through-hole 72, a rolling element retaining portion 85) retaining the rolling element 20, the retaining portion that is closest to the spreading portion 55*b*, 65*b*. Accordingly, the spreading portion 55*b*, 65*b* may set aside the foreign object to the side of the protruding portion 63B before the foreign object reaches the retaining portion. By removing the foreign object from the path of the rolling element 20, the rolling element 20 is made to smoothly roll.

According to further aspect of this disclosure, the protruding portion 63, 63A, 63B of the seat slide apparatus 10 for a vehicle is formed in a pyramid form where one of peak points 63*t* of the pyramid form serves as the top portion P0 that is arranged to slidably contact with the rolling surface S.

Upon the arrangement described herewith, the sliding resistance of the protruding portion 63, 63A, 63B may be made to small so that a smooth movement of the lower rails 5 and the upper rails 6 relative to each other may be secured.

According to another aspect of this disclosure, the retaining member 21 of the seat slide apparatus 10 for a vehicle includes an extending portion 54 extending in the elongating direction. The extending portion 54 includes a second ridge line portion (a ridge line L1) extending in the elongating direction. A protruding height H1 of the extending portion 54 becomes shorter relative to the second ridge line portion towards each edge portion of the extending portion 54 in a direction perpendicular to the elongating direction. Furthermore, the protruding portion 53 includes the spreading portion 55, 55*a*, 55*b* arranged at an end portion of the extending portion 54 in the elongating direction. The spreading portion 55, 55a, 55b is arranged in a state where the first ridge line portion (the ridge line L, L2, L3) and the second ridge line portion are aligned to form a continuous form.

Upon the arrangement described herewith, the foreign object may be further effectively set aside to the side of the protruding portion 53. Accordingly, the foreign object may be more effectively removed from the path of the rolling element 20. By removing the foreign object from the path of the rolling element 20, the rolling element 20 is made to smoothly roll.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
    an upper rail retaining a seat above the upper rail;
    a lower rail retaining the upper rail in a state where the upper rail moves relative to the lower rail;
    a rolling element arranged between the lower rail and the upper rail; and
    a retaining member configured to retain the rolling element between the lower rail and the upper rail, the retaining member including a protruding portion having a top portion arranged to slidably contact with a rolling surface at which the rolling element rolls, wherein
    the protruding portion includes a spreading portion extending from the top portion in an elongating direction, the elongating direction conforming to a path of the rolling element formed on the rolling surface, the spreading portion tapering to a sharp end form with an increasing distance from the top portion in the elongating direction, the spreading portion configured to remove a foreign object from the path,
    wherein the spreading portion is formed to have the sharp end form including a first ridge line portion extending from the top portion in the elongating direction and wherein a protruding height of the spreading portion becomes shorter relative to the first ridge line portion towards each edge portion of the spreading portion in a width direction of the spreading portion and wherein the spreading portion becomes narrower in the width direction and the protruding height of the spreading portion becomes shorter with an increasing distance from the top portion in the elongating direction.

2. The seat slide apparatus for a vehicle according to claim 1, wherein the retaining member includes a retaining portion retaining the rolling element and wherein the protruding portion includes the spreading portion having the sharp end form facing toward a direction of the retaining portion retaining the rolling element.

3. The seat slide apparatus for a vehicle according to claim 1, wherein the retaining member includes a retaining portion retaining the rolling element and wherein the protruding portion includes the spreading portion having the sharp end form facing toward a direction opposite of the retaining portion retaining the rolling element.

4. The seat slide apparatus for a vehicle according to claim 2, wherein the retaining member includes the retaining portion retaining the rolling element and wherein the protruding portion includes the spreading portion having the sharp end form facing toward a direction opposite of the retaining portion retaining the rolling element.

5. The seat slide apparatus for a vehicle according to claim 1, wherein the protruding portion is formed in a pyramid form where one of peak points of the pyramid form serves as the top portion that is arranged to slidably contact with the rolling surface.

6. The seat slide apparatus for a vehicle according to claim 1, wherein
    the retaining member includes an extending portion extending in the elongating direction, and wherein
    the extending portion includes a second ridge line portion extending in the elongating direction and a protruding height of the extending portion becomes shorter relative to the second ridge line portion towards each edge portion of the extending portion in a direction perpendicular to the elongating direction, and wherein
    the protruding portion includes the spreading portion arranged at an end portion of the extending portion in the elongating direction, the spreading portion arranged in a state where the first ridge line portion and the second ridge line portion are aligned to form a continuous form.

* * * * *